United States Patent
Na et al.

(10) Patent No.: US 12,047,137 B2
(45) Date of Patent: Jul. 23, 2024

(54) ELECTRONIC DEVICE FOR DETECTING EXTERNAL OBJECT USING ANTENNA ARRAY AND OPERATION METHOD THEREOF

(71) Applicant: Samsung Electronics Co., Ltd., Suwon-si (KR)

(72) Inventors: Hyoseok Na, Suwon-si (KR); Hyungsup Byeon, Suwon-si (KR); Sunkey Lee, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 17/275,899

(22) PCT Filed: Aug. 6, 2019

(86) PCT No.: PCT/KR2019/009796
§ 371 (c)(1),
(2) Date: Mar. 12, 2021

(87) PCT Pub. No.: WO2020/054973
PCT Pub. Date: Mar. 19, 2020

(65) Prior Publication Data
US 2022/0060230 A1    Feb. 24, 2022

(30) Foreign Application Priority Data
Sep. 14, 2018  (KR) .......... 10-2018-0109960

(51) Int. Cl.
*H04B 7/06* (2006.01)
*G06V 40/16* (2022.01)
*H04W 12/06* (2021.01)

(52) U.S. Cl.
CPC ......... *H04B 7/0617* (2013.01); *G06V 40/166* (2022.01); *H04W 12/06* (2013.01)

(58) Field of Classification Search
CPC ........ G06F 1/163; G06F 3/017; H04W 12/06; H04B 7/0617; G06V 40/166
See application file for complete search history.

(56) References Cited

U.S. PATENT DOCUMENTS

| 8,437,384 B2 | 5/2013 | Maguire |
| 8,781,420 B2 | 7/2014 | Schlub et al. |

(Continued)

FOREIGN PATENT DOCUMENTS

| KR | 10-2014-0041939 A | 4/2014 |
| KR | 10-2015-0019352 A | 2/2015 |

(Continued)

OTHER PUBLICATIONS

Gaspar et al., "Anti-UAV Mobile System with RTLS Integration and User Authentication," 2019 International Conference on Sensing and Instrumentation in IoT Era (ISSI) Year: 2019 | Conference Paper | Publisher: IEEE.*

(Continued)

*Primary Examiner* — Roderick Tolentino
(74) *Attorney, Agent, or Firm* — Jefferson IP Law, LLP

(57) ABSTRACT

An electronic device includes a camera including at least one lens, an antenna array capable of outputting a beamforming signal in a direction corresponding to an axis of the at least one lens, a communication circuit electrically connected with the antenna array, and a processor. The processor may identify a function being executed through the processor, may output a first specified beamforming signal capable of communicating with an external electronic device through the antenna array by using the communication circuit, when the function does not use the camera, and may (Continued)

output a second specified beamforming signal capable of detecting an external object through the antenna array by using the communication circuit, when the function uses the camera.

15 Claims, 24 Drawing Sheets

(56) References Cited

U.S. PATENT DOCUMENTS

| | | | |
|---|---|---|---|
| 8,891,594 B2 | 11/2014 | Maguire | |
| 8,897,344 B2 | 11/2014 | Maguire | |
| 8,903,329 B2 | 12/2014 | Maguire | |
| 9,071,336 B2 | 6/2015 | Schlub et al. | |
| 9,179,299 B2 | 11/2015 | Schlub et al. | |
| 9,921,657 B2 | 3/2018 | Sprenger et al. | |
| 10,063,267 B2 | 8/2018 | Maguire | |
| 10,268,302 B2 | 4/2019 | Kwon et al. | |
| 10,474,861 B2 | 11/2019 | Kang et al. | |
| 10,503,883 B1* | 12/2019 | Gillian | G06F 21/32 |
| 10,540,001 B1 | 1/2020 | Poupyrev et al. | |
| 10,705,185 B1 | 7/2020 | Lien et al. | |
| 10,768,712 B2 | 9/2020 | Schwesig et al. | |
| 10,817,065 B1 | 10/2020 | Lien et al. | |
| 10,823,841 B1 | 11/2020 | Lien et al. | |
| 10,891,947 B1* | 1/2021 | Le Chevalier | G06F 3/167 |
| 10,908,696 B2 | 2/2021 | Amihood et al. | |
| 2014/0187174 A1* | 7/2014 | Safavi | H01Q 21/205 455/73 |
| 2014/0206297 A1 | 7/2014 | Schlub et al. | |
| 2015/0249916 A1 | 9/2015 | Schlub et al. | |
| 2015/0277569 A1 | 10/2015 | Sprenger et al. | |
| 2016/0195986 A1 | 7/2016 | Kwon et al. | |
| 2017/0039405 A1* | 2/2017 | Twogood | H04B 7/024 |
| 2017/0097413 A1 | 4/2017 | Gillian et al. | |
| 2017/0235364 A1* | 8/2017 | Nakamura | G06F 3/016 345/156 |
| 2017/0323135 A1 | 11/2017 | Kang et al. | |
| 2018/0068567 A1* | 3/2018 | Gong | G05D 1/106 |
| 2018/0335514 A1* | 11/2018 | Dees | G01S 13/765 |
| 2019/0193646 A1* | 6/2019 | Blaicher | H04N 7/18 |
| 2020/0128421 A1* | 4/2020 | Yang | H04B 7/022 |
| 2020/0186378 A1* | 6/2020 | Six | H04L 12/2803 |

FOREIGN PATENT DOCUMENTS

| | | |
|---|---|---|
| KR | 10-2017-0077370 A | 12/2015 |
| KR | 10-2016-0059342 A | 5/2016 |
| KR | 10-2017-0005171 A | 1/2017 |
| KR | 10-2017-0021638 A | 2/2017 |
| KR | 10-2018-0033852 A | 4/2018 |

OTHER PUBLICATIONS

Zhou et al., "NAuth: Secure Face-to-Face Device Authentication via Nonlinearity," IEEE Infocom 2019—IEEE Conference on Computer Communications Year: 2019 | Conference Paper | Publisher: IEEE.*

Korean Office Action dated Oct. 20, 2022, issued in Korean Application No. 10-2018-0109960.

* cited by examiner

ELECTRONIC DEVICE FOR DETECTING EXTERNAL OBJECT USING ANTENNA ARRAY AND OPERATION METHOD THEREOF

TECHNICAL FIELD

Embodiments of the disclosure relate to an electronic device for detecting an external object by using an antenna array and a method thereof.

BACKGROUND ART

An electronic device may detect an external object by using a camera sensor. For example, the electronic device may execute face detection, liveness detection, and facial landmark detection, and may recognize a face of a user depending on an execution result. For another example, the electronic device may recognize a gesture of the user. The electronic device may authenticate the user through the recognized face or gesture of the user.

DISCLOSURE OF INVENTION

Technical Problem

A portable electronic device such as a smartphone may include a camera sensor such as a red, green, and blue (RGB) sensor or an infrared rays (IR) sensor. Because a frame rate or a resolution of the RGB sensor or the IR sensor may be limited, there may be a decrease in the accuracy of detection. For example, an electronic device may fail to distinguish between an actual face of the user and an image of the user in the liveness detection. In this case, security risks may occur in a user authentication process.

Embodiments of the disclosure are to provide a method for detecting an external object by using an antenna module (or an antenna array) disposed at an electronic device.

Solution to Problem

An electronic device according to an embodiment of the disclosure may include a camera including at least one lens, an antenna array capable of outputting a beamforming signal in a direction corresponding to an axis of the at least one lens, a communication circuit electrically connected with the antenna array, and a processor. The processor may identify a function being executed through the processor, may output a first specified beamforming signal capable of communicating with an external electronic device through the antenna array by using the communication circuit, when the function does not use the camera, and may output a second specified beamforming signal capable of detecting an external object through the antenna array by using the communication circuit, when the function uses the camera.

A method of an electronic device according to an embodiment of the disclosure may include executing a camera, identifying an external object by using the executed camera, performing beamforming, based on direction information corresponding to at least a portion of the external object, and performing user authentication, based at least on a result of performing the beamforming.

An electronic device according to an embodiment of the disclosure may include at least one processor, a first communication circuit for up-converting a signal in a first frequency band obtained from the at least one processor into a signal in a second frequency band higher than the first frequency band, a first antenna module disposed in a first region of the electronic device and including a second communication circuit for up-converting the signal in the second frequency band obtained from the first communication circuit into a signal in a third frequency band higher than the second frequency band, and a second antenna module disposed in a second region of the electronic device and including the second communication circuit for up-converting the signal in the second frequency band into the signal in the third frequency band, and the at least one processor may perform communication using the signal in the third frequency band by using the second antenna module or may recognize an external object by using the second antenna module.

Advantageous Effects of Invention

According to embodiments of the disclosure, an electronic device may make the accuracy of detection high without adding a separate hardware component, by detecting an external object by using an antenna module disposed at the electronic device.

According to embodiments of the disclosure, the electronic device may make the security high by authenticating a user by using the antenna module.

Besides, a variety of effects directly or indirectly understood through this disclosure may be provided.

With regard to description of drawings, the same or similar components will be marked by the same or similar reference signs.

BEST MODE FOR CARRYING OUT THE INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
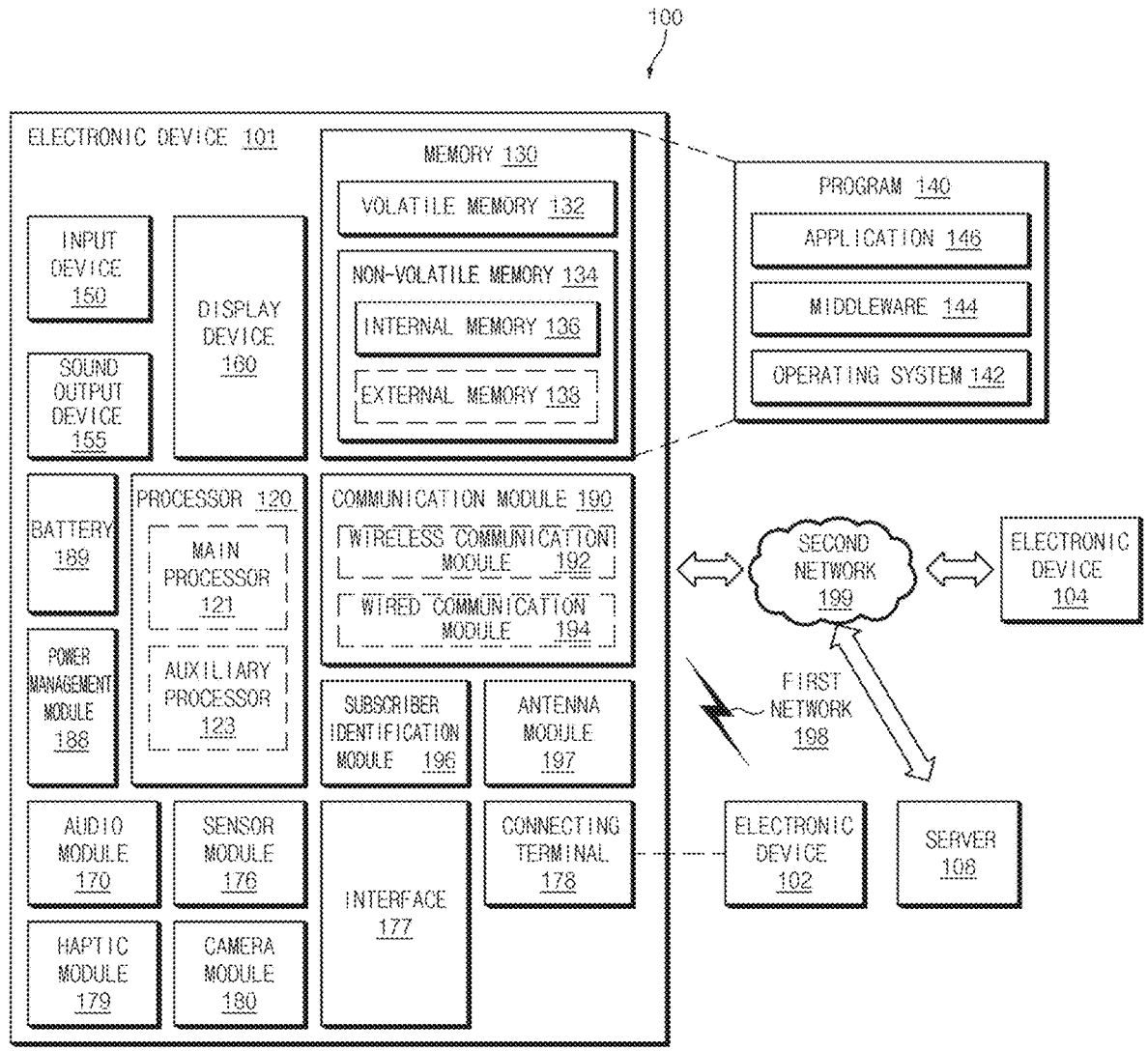
FIG. 1 is a block diagram of an electronic device in a network environment, according to various embodiments.

FIG. 1 is a block diagram of an electronic device 101 in a network environment 100 according to various embodiments.

Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device). According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
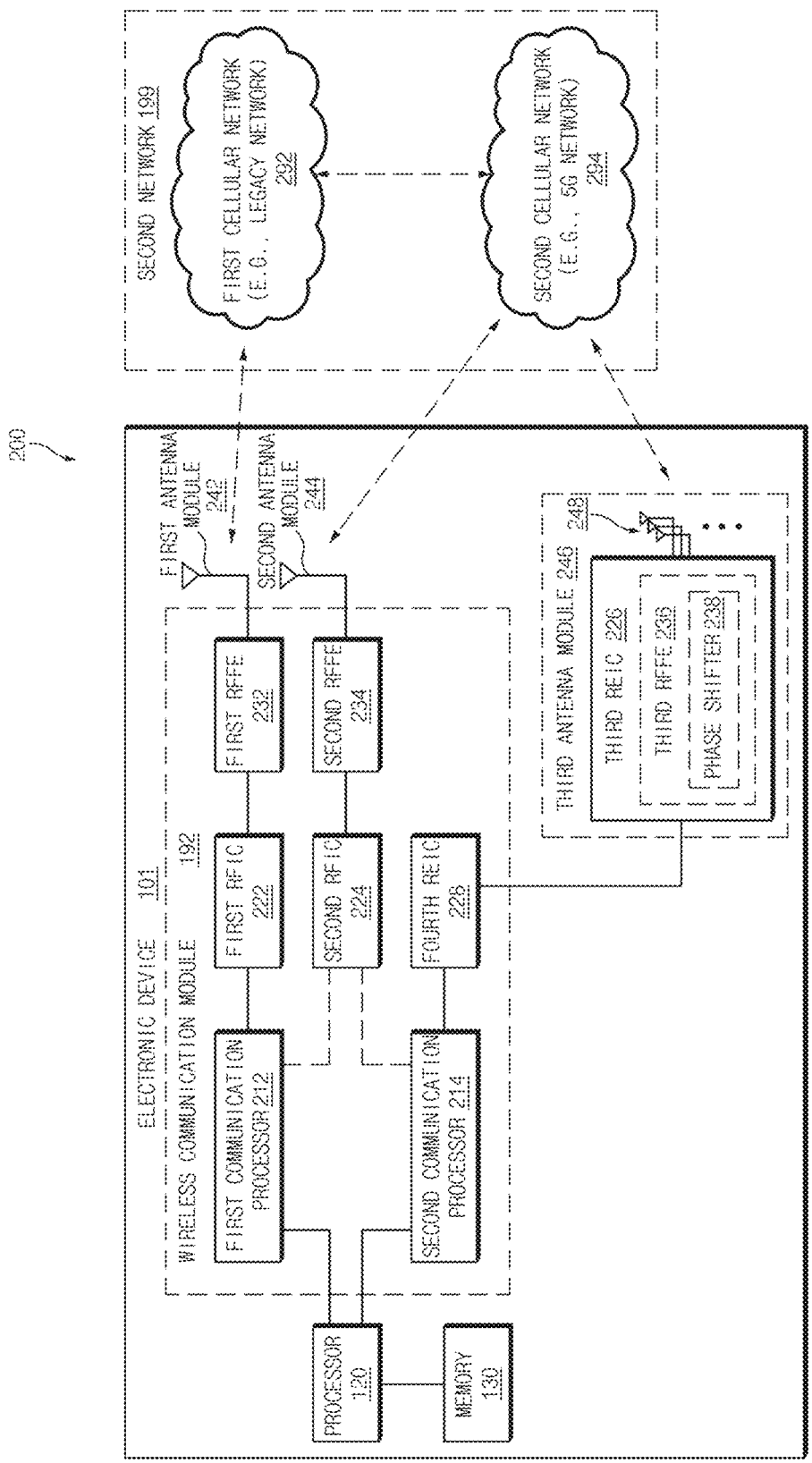
FIG. 2 is a block diagram of an electronic device in a network environment including a plurality of cellular networks, according to various embodiments.

FIG. 2 is a block diagram 200 of the electronic device 101 in a network environment including a plurality of cellular networks, according to various embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one network different therefrom. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. According to various embodiments, the first cellular network may be a legacy network including a 2nd generation (2G), 3G, 4G, or long term evolution (LTE) network. The second communication processor 214 may establish a communication channel corresponding to a specified band (e.g., about 6 GHz to about 60 GHz) of bands to be used for wireless communication with the second cellular network 294 and may support the 5G network communication over the established communication channel. According to various embodiments, the second cellular network 294 may be a 5G network defined in the 3GPP. Additionally, according to an embodiment, the first communication processor 212 or the second communication processor 214 may establish a communication channel corresponding to another specified band (e.g., about 6 GHz or lower) of the bands to be used for wireless communication with the second cellular network 294 and may support the 5G network communication over the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the auxiliary processor 123, or the communication module 190. According to an embodiment, the first communication processor 212 and the second communication processor 214 may be directly or indirectly connected by an interface (not illustrated) and may provide or receive data or a control signal unidirectionally or bidirectionally.

In the case of transmitting a signal, the first RFIC 222 may convert a baseband signal generated by the first communication processor 212 into a radio frequency (RF) signal ranging from about 700 MHz to about 3 GHz, which is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., about 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., about 6 GHz to about 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. The third RFIC 226 may convert the preprocessed 5G Above6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., about 9 GHz to about 11 GHz) and may provide the IF signal to the third RFIC 226. The third RFIC 226 may convert the IF signal into a 5G Above6 RF signal. In the case of receiving a signal, a 5G Above6 RF signal may be received from the second cellular network 294 (e.g., a 5G network) through an antenna (e.g., the third antenna 248) and may be converted into an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or may be combined with any other antenna module to process RF signals in a plurality of bands.

According to an embodiment, the third RFIC 226 and the antenna 248 may be disposed at the same substrate to form a third antenna module 246. For example, the wireless communication module 192 or the processor 120 may be disposed on a first substrate (e.g., a main PCB). In this case, the third RFIC 226 may be disposed on a partial region (e.g., a lower surface) of a second substrate (e.g., a sub PCB) independent of the first substrate, and the antenna 248 may be disposed on another partial region (e.g., an upper surface) of the second substrate. As such, the third antenna module 246 may be formed. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., about 6 GHz to about 60 GHz) used for the 5G network communication from being lost (or attenuated) due to the transmission line. As such, the electronic device 101 may improve the quality or speed of communication with the second cellular network 294 (e.g., a 5G network).

According to an embodiment, the antenna 248 may be formed of an antenna array that includes a plurality of antenna elements capable of being used for beamforming. In this case, the third RFIC 226 may include, for example, a plurality of phase shifters 238 corresponding to the plurality of antenna elements, as a part of the third RFFE 236. In the case of transmitting a signal, each of the plurality of phase shifters 238 may shift a phase of the 5G Above6 RF signal to be transmitted to the outside (e.g., a base station of a 5G network) of the electronic device 101 through the corresponding antenna element. In the case of receiving a signal, each of the plurality of phase shifters 238 may shift a phase of the 5G Above6 RF signal received from the outside through the corresponding antenna element to the same or substantially the same phase. This may enable the transmission or reception between the electronic device 101 and the outside through the beamforming.

The second cellular network 294 (e.g., a 5G network) may be used independently of the first cellular network 292 (e.g., a legacy network) (e.g., this scheme being called "stand-alone (SA)") or may be used in connection with the first cellular network 292 (e.g., this scheme being called "non-stand-alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3:
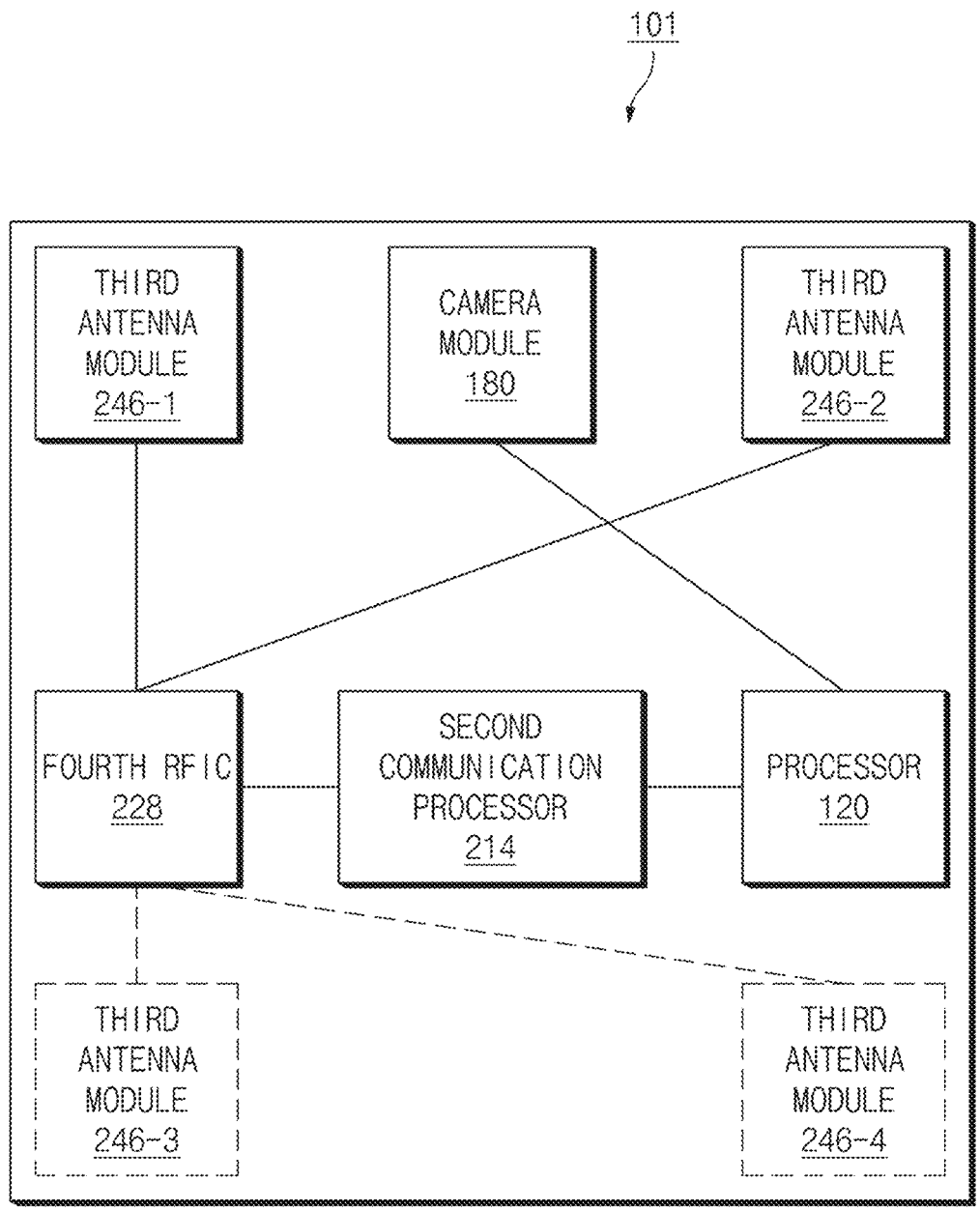
FIG. 3 illustrates a block diagram of an electronic device including a plurality of antenna modules, according to various embodiments.

FIG. 3 illustrates a block diagram of the electronic device 101 including a plurality of third antenna modules 246-1, 246-2, 246-3, and 246-4, according to various embodiments.

Referring to FIG. 3, the electronic device 101 may include the plurality of third antenna modules 246-1, 246-2, 246-3, and 246-4. According to an embodiment, each of the plurality of third antenna modules 246-1, 246-2, 246-3, and 246-4 may correspond to the third antenna module 246 of FIG. 2. The number of third antenna modules is not limited to the example illustrated in FIG. 3. For example, the electronic device 101 may not include at least one of the third antenna modules 246-1, 246-3, and 246-4.

According to an embodiment, one third antenna module (e.g., 246-2) of the plurality of third antenna modules 246-1, 246-2, 246-3, and 246-4 may transmit a signal in an ultra-high frequency band (e.g., 6 GHz or higher) for detecting an external object by using the beamforming. The signal in the ultra-high frequency band may be based on, for example, the standard (e.g., 802.11ad) of wireless gigabit alliance (Wi-Gig), which operates in a frequency band of 60 GHz or higher, or may be based on an ultra-wide band (UWB) technology. Because the third antenna module 246-2 may have a high resolution and a high frame rate through a signal in an ultra-high frequency band, the electronic device 101 may detect an external object more accurately through the third antenna module 246-2. According to an embodiment, the third antenna module 246-2 may perform only an external object detecting function, or may selectively perform an external object detecting function and a wireless communication function. In the case where the third antenna module 246-2 selectively performs the external object detecting function and the wireless communication function, the third antenna module 246-2 may operate in a time-division manner.

According to an embodiment, a third antenna module (e.g., at least one of 246-1, 246-3, or 246-4) configured to perform wireless communication may be disposed at a front part or a side part of the electronic device 101 for the purpose of making the efficiency of wireless communication high; on the other hand, the third antenna module 246-2 configured to detect an external object may be disposed at a location adjacent to the camera module 180. For example, the third antenna module 246-2 may be disposed at a front part or a back part of the electronic device 101.

According to an embodiment, because the fourth RFIC 228 may convert a baseband signal into an RF signal, the fourth RFIC 228 may be referred to as an "intermediate frequency integrated circuit (IFIC)". The fourth RFIC 228 may be operatively connected with the plurality of third antenna modules 246-1, 246-2, 246-3, and 246-4.

According to an embodiment, the processor 120 (e.g., an application processor) may be operatively connected with the second communication processor 214 for the purpose of transmitting or receiving a wireless communication signal. The processor 120 and the second communication processor 214 may be implemented with a separate chip or may be implemented with a single chip or a single package.

According to an embodiment, the processor 120 may be operatively connected with the camera module 180 for the purpose of obtaining an image associated with an external object. According to an embodiment, the camera module 180 may be disposed on at least one of a front surface or a back surface of the electronic device 101.

According to an embodiment, in the case where the third antenna module 246-2 selectively performs the external object detecting function and the wireless communication function, the processor 120 may control the functions of the third antenna module 246-2. For example, when a function (e.g., an image photographing or user authentication function) using the camera module 180 from among functions of the electronic device 101 is executed, the processor 120 may allow the third antenna module 246-2 to detect an external object; when the function using the camera module 180 is not executed, the processor 120 may allow the third antenna module 246-2 to perform the wireless communication function.

Figure 4A:
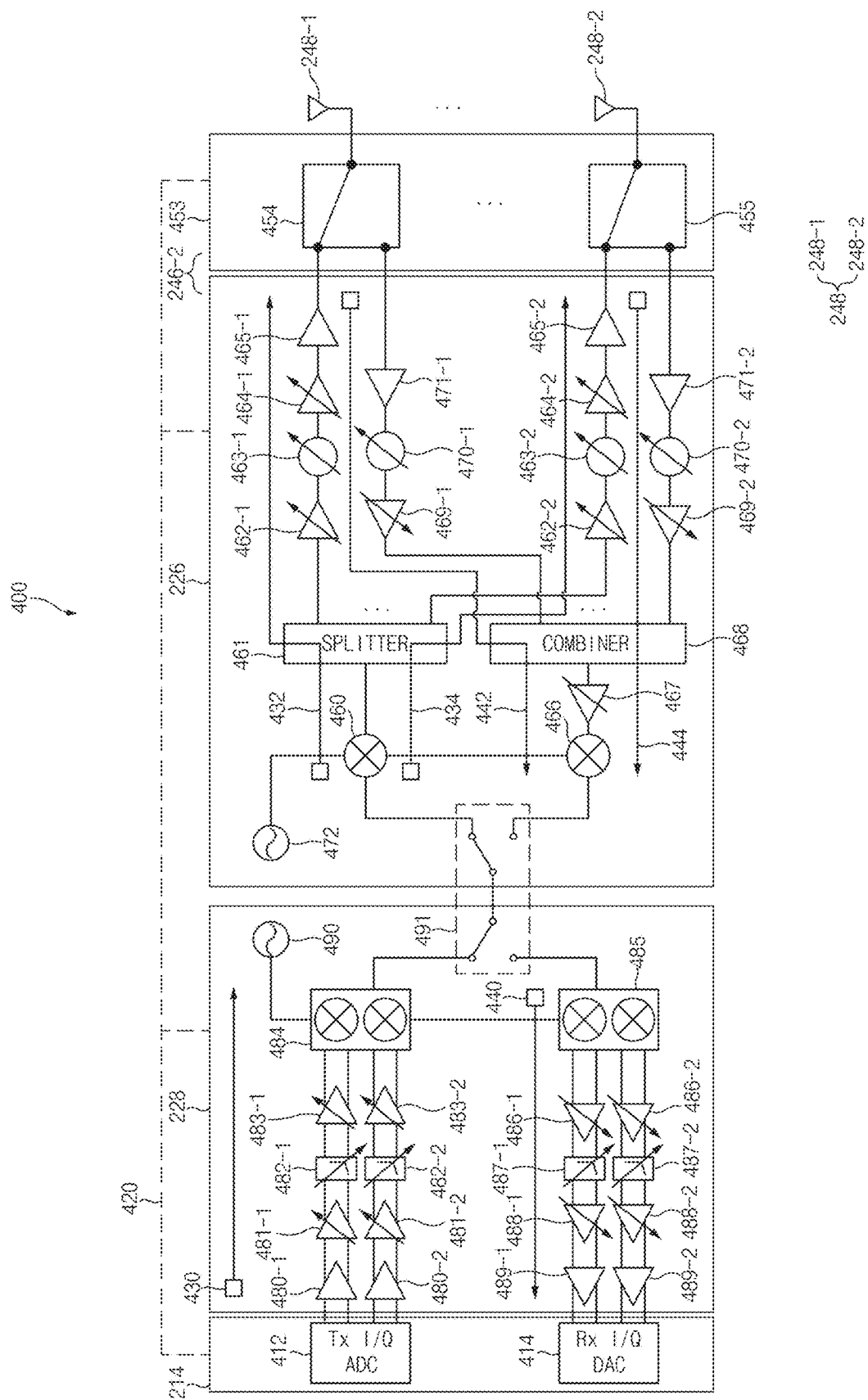
FIG. 4A illustrates a communication system of an electronic device performing beamforming, according to various embodiments.

FIG. 4A illustrates a communication system 400 of the electronic device 101 performing beamforming, according to various embodiments.

In the following description to be given with reference to FIG. 4A, at least a part of functions and structures of components having the same upper reference numeral portion (e.g., "480" in 480-1) but different lower reference numeral portions (e.g., "1" in 480-1) are different may be the same, and additional description associated with the duplicated function(s) and structure(s) will be omitted to avoid redundancy. Also, FIG. 4A shows an example where the third antenna module 246-2 configured to detect an external object performs beamforming, but the same principle may be applied to a third antenna module(s) (e.g., 246-1, 246-3, or 246-4) different from the third antenna module 246-2.

FIG. 4A illustrates the communication system 400 capable of processing a data stream with "n" chains (n being a natural number). The communication system 400 may include the second communication processor 214, the fourth RFIC 228 (or referred to as an "IFIC"), and the third antenna module 246-2. The third antenna module 246-2 may include the third RFIC 226 and the antenna 248.

According to an embodiment, the second communication processor 214 may control any other components of the communication system 400 for the transmission and/or reception of signals. For example, the second communication processor 214 may be electrically connected with the fourth RFIC 228, the third RFIC 226, and/or a path selecting circuit 453, and may control the fourth RFIC 228, the third RFIC 226, and/or the path selecting circuit 453 by using a control signal.

According to an embodiment, the second communication processor 214 may include an analog to digital converter (ADC) 412, and a digital to analog converter (DAC) 414.

According to an embodiment, the ADC 412 may convert a transmit signal from an analog signal into a digital signal. The ADC 412 may process I-component and Q-component signals of the transmit signal.

According to an embodiment, the DAC 414 may convert a receive signal from a digital signal into an analog signal. The DAC 414 may process I-component and Q-component signals of the receive signal.

According to an embodiment, the fourth RFIC 228 may convert a baseband signal obtained from the second communication processor 214 into an IF signal or may convert an IF signal obtained from the third antenna module 246-2 (or the third RFIC 226) into a baseband signal. The IF signal converted by the fourth RFIC 228 may be input to the third antenna module 246-2.

According to an embodiment, the fourth RFIC 228 may include an IF transmission chain 430 and an IF reception chain 440 configured to process a data stream in an IF frequency band. According to an embodiment, the IF transmission chain 430 and the IF reception chain 440 may be selectively connected with the third antenna module 246-2 (or the third RFIC 226).

According to an embodiment, the IF transmission chain 430 may include at least one of buffers 480-1 and 480-2, first variable gain amplifiers (VGAs) 481-1 and 481-2, low pass filters (LPFs) 482-1 and 482-2, second VGAs 483-1 and 483-2, or a quadrature mixer 484.

According to an embodiment, the buffers 480-1 and 480-2 may perform a buffer function in receiving a signal output from the second communication processor 214 and may stably process a signal. The signal output from the second communication processor 214 may be a balanced I/Q signal.

According to an embodiment, the first VGAs 481-1 and 481-2 may perform auto gain control (AGC). The first VGAs 481-1 and 481-2 may perform AGC on a transmit signal under control of the second communication processor 214.

According to an embodiment, the LPFs 482-1 and 482-2 may operate as a channel filter. The LPFs 482-1 and 482-2 may function as a channel filter that has a bandwidth of a balanced I/Q signal in a base band as a cutoff frequency. The cutoff frequency may be variable.

According to an embodiment, the second VGAs 483-1 and 483-2 may perform AGC as in the first VGAs 481-1 and 481-2, and a range of amplification of the second VGAs 483-1 and 483-2 may be the same as or different from that of the first VGAs 481-1 and 481-2.

According to an embodiment, the quadrature mixer 484 may up-convert the balanced I/Q signal thus obtained. The quadrature mixer 484 may perform an operation by using the balanced I/Q signal and a signal generated by an oscillator 490 as inputs and may generate an IF signal.

According to an embodiment, the IF reception chain 440 may include at least one of buffers 489-1 and 489-2, third VGAs 488-1 and 488-2, LPFs 487-1 and 487-2, second VGAs 486-1 and 486-2, or a quadrature mixer 485.

According to an embodiment, the buffers 489-1 and 489-2 may perform a buffer function in transferring a signal output from the third VGAs 488-1 and 488-2 to the second communication processor 214 and may stably process a signal. Signals output from the third VGAs 488-1 and 488-2 may be a balanced I/Q signal.

According to an embodiment, the third VGAs 488-1 and 488-2 may perform AGC. The third VGAs 488-1 and 488-2 may perform AGC on a receive signal under control of the second communication processor 214. A range of amplification by the third VGAs 488-1 and 488-2 may be the same as or different from those of the second VGAs 483-1 and 483-2 and the first VGAs 481-1 and 481-2.

According to an embodiment, the LPFs 487-1 and 487-2 may operate as a channel filter. The LPFs 487-1 and 487-2 may operate in a bandwidth of a balanced I/Q signal in a base band as a cutoff frequency. The cutoff frequency may be variable.

According to an embodiment, the fourth VGAs 486-1 and 486-2 may perform AGC. A range of amplification by the fourth VGAs 486-1 and 486-2 may be the same as or different from those of the third VGAs 488-1 and 488-2, the second VGAs 483-1 and 483-2, and the first VGAs 481-1 and 481-2.

According to an embodiment, the quadrature mixer 485 may convert the obtained IF signal. The quadrature mixer 485 may down-convert the IF signal and may generate a balanced I/Q signal. The quadrature mixer 485 may obtain an I-component signal and a Q-component signal by using the signal obtained from the oscillator 490 and the IF signal.

According to an embodiment, the communication system 400 may include a selection circuit 491 that makes a selective connection of the IF transmission chain 430 or the IF reception chain 440 when connecting the fourth RFIC 228 and the third RFIC 226. For example, in the case of transmitting a signal, the second communication processor 214 may connect the IF transmission chain 430 in the fourth RFIC 228 and an RF transmission chain 432 in the third RFIC 226. For example, in the case of receiving a signal, the second communication processor 214 may connect the IF reception chain 440 in the fourth RFIC 228 and an RF reception chain 442 in the third RFIC 226.

According to an embodiment, the selection circuit 491 may include at least one switch. For example, the selection circuit 491 may include a first switch in the fourth RFIC 228 and may include a second switch in the third RFIC 226. In this case, during transmitting a signal, the first switch and the second switch may select the IF transmission chain 430 and the RF transmission chain 432 under control of the second communication processor 214; during receiving a signal, the first switch and the second switch may select the IF reception chain 440 and the RF reception chain 442 under control of the second communication processor 214. In the case where an intermediate frequency (IF) is high, the connection of transmission lines between the fourth RFIC 228 and the third RFIC 226 may be difficult. The number of the transmission lines may be decreased by selectively connecting transmission/reception chains by using the switches in a time division duplex (TDD) operation.

According to an embodiment, the third antenna module 246-2 may include the third RFIC 226 and an antenna array 248 (e.g., the antenna 248 of FIG. 2). In this case, the third RFIC 226 may be electrically connected with the antenna array 248 through the path selecting circuit 453.

According to an embodiment, the third RFIC 226 may convert an IF signal obtained from the fourth RFIC 228 into an RF signal or may convert an RF signal received through a plurality of antenna elements (e.g., 248-1 and 248-2) in the antenna array 248 into an IF signal. The RF signal may be transmitted or received through the plurality of antenna elements 248-1 and 248-2.

According to an embodiment, the third RFIC 226 may include RF transmission chains 432 and 434 and RF reception chains 442 and 444 configured to process a data stream in an RF frequency band. According to an embodiment, the RF transmission chain 432 and the RF reception chain 442 may be electrically connected with the antenna element 248-1, and the RF transmission chain 434 and the RF reception chain 444 may be electrically connected with the antenna element 248-2.

According to an embodiment, the RF transmission chain 432 may include at least one of a mixer 460, a splitter 461, a fifth VGA 462-1, a phase shifter 463-1 (e.g., at least a part of the phase shifters 238 of FIG. 2), a sixth VGA 464-1, and a power amplifier 465-1. Below, the principle of operations of components included in the RF transmission chain 432 may be identically or similarly applied to the RF transmission chain 434.

According to an embodiment, the mixer 460 may convert an IF signal obtained from the fourth RFIC 228 into an RF signal. The mixer 460 may convert an IF signal into an RF signal by using a signal generated by an oscillator 472. The oscillator 472 may be disposed inside or outside the third RFIC 226.

According to an embodiment, the splitter 461 may split an input signal into a plurality of signals. The plurality of signals split by the splitter 461 may be transferred to the plurality of antenna elements 248-1 and 248-2, respectively.

According to an embodiment, the fifth VGA 462-1 may perform AGC. The fifth VGA 462-1 may obtain a control signal, which allows the AGC to be performed, from the second communication processor 214.

According to an embodiment, the sixth VGA 464-1 may perform AGC. The case where the number of VGAs included in the RF transmission chain 432 is "2" is illustrated in FIG. 4A by way of example, but the number of VGAs may be variously changed or modified. For another example, a range of amplification of the fifth VGA 462-1 may be the same as or different from a range of amplification of the sixth VGA 464-1.

According to an embodiment, the phase shifter 463-1 may shift a phase of a signal. The phase shifter 463-1 may obtain a control signal from the second communication processor 214 and may shift a phase depending on the control signal. The phase shifter 463-1 may shift a phase of an input signal depending on a beamforming angle (or direction).

According to an embodiment, the power amplifier 465-1 may amplify a power of a signal output from the phase shifter 463-1.

According to an embodiment, at least one of the fifth VGA 462-1, the phase shifter 463-1, the sixth VGA 464-1, and the power amplifier 465-1 may be disposed inside or outside the third RFIC 226.

According to an embodiment, the RF reception chain 442 may include at least one of a low noise amplifier (LNA) 471-1, a phase shifter 470-1 (e.g., at least a part of the phase shifters 238 of FIG. 2), a seventh VGA 469-1, a combiner 468, an eighth VGA 467, and a mixer 466. The components may be disposed within the third RFIC 226. Below, the principle of operations of components included in the RF reception chain 442 may be identically or similarly applied to the RF reception chain 444.

According to an embodiment, the LNA 471-1 may perform low noise amplification of a signal received from the plurality of antenna elements 248-1 and 248-2.

According to an embodiment, the phase shifter 470-1 may shift a phase of a signal depending on a beamforming angle. The phase shifter 470-1 may align a signal phase between the plurality of RF reception chains 442 and 444 to the same or like range. The phase shifter 470-1 may operate under control of the second communication processor 214.

According to an embodiment, the seventh VGA 469-1 may perform reception AGC. The number of seventh VGAs (e.g., 469-1) may be variously changed or modified according to various embodiments.

According to an embodiment, the combiner 468 may combine signals obtained from the plurality of antenna elements 248-1 and 248-2. A signal output from the combiner 468 may be transferred to the mixer 466 through the eighth VGA 467. The mixer 466 may convert the received RF signal to an IF signal. The mixer 466 may down-convert an RF signal by using a signal obtained from the oscillator 472.

According to an embodiment, an IF transmission chain and an RF transmission chain may be referred to as a "transmission chain", and an IF reception chain and an RF reception chain may be referred to as a "reception chain". For example, the IF transmission chain 430 and the RF transmission chain 432 (or the RF transmission chain 434) may be referred to as a "transmission chain", and the IF reception chain 440 and the RF reception chain 442 (or the RF reception chain 444) may be referred to as a "reception chain".

According to an embodiment, the plurality of antenna elements 248-1 and 248-2 may be arranged in the form of an array to form the antenna array 248. The case where the number of antenna elements 248-1 and 248-2 included in the third antenna module 246-2 is "2" is illustrated in FIG. 4, not limited thereto. For example, the number of antennas disposed in the third antenna module 246-2 may be variously changed.

According to an embodiment, the plurality of antenna elements 248-1 and 248-2 may transfer an obtained signal to the third RFIC 226 or may transmit a signal processed by the third RFIC 226. The plurality of antenna elements 248-1 and 248-2 may be electrically connected with the RF transmission chains 432 and 434 or the RF reception chains 442 and 444 in the third RFIC 226. For example, the antenna element 248-1 may be electrically connected with the RF transmission chain 432 or the RF reception chain 442, and the antenna element 248-2 may be electrically connected with the RF transmission chain 434 or the RF reception chain 444.

According to an embodiment, the plurality of antenna elements 248-1 and 248-2 may be electrically connected with the RF transmission chains 432 and 434 or the RF reception chains 442 and 444 in the third RFIC 226 selectively. To this end, the third antenna module 246-2 may include the path selecting circuit 453. The path selecting circuit 453 may connect the plurality of antenna elements 248-1 and 248-2 with the RF transmission chains 432 and 434 during transmitting a signal, and may connect the plurality of antenna elements 248-1 and 248-2 with the RF reception chains 442 and 444. The path selecting circuit 453 or internal components of the path selecting circuit 453 may operate under control of the second communication processor 214. The path selecting circuit 453 may operate to transmit or receive a signal based on a time in a time division duplex (TDD) system. The plurality of antenna elements 248-1 and 248-2 may be connected with a duplexer (not illustrated). In this case, the communication system 400 may operate in a frequency division duplex (FDD) manner.

According to an embodiment, the second communication processor 214 may control at least one of the fourth RFIC 228, the third RFIC 226, and the path selecting circuit 453 through a control interface 420. The control interface 420 may be, for example, a communication interface including at least one of a mobile industry processor interface (MIPI), an inter-integrated circuit (I2C), a peripheral component interconnect express (PCIe), a universal asynchronous receiver/transmitter (UART), a universal serial bus (USB), and/or a general-purpose input/output (GPIO).

Figure 4B:
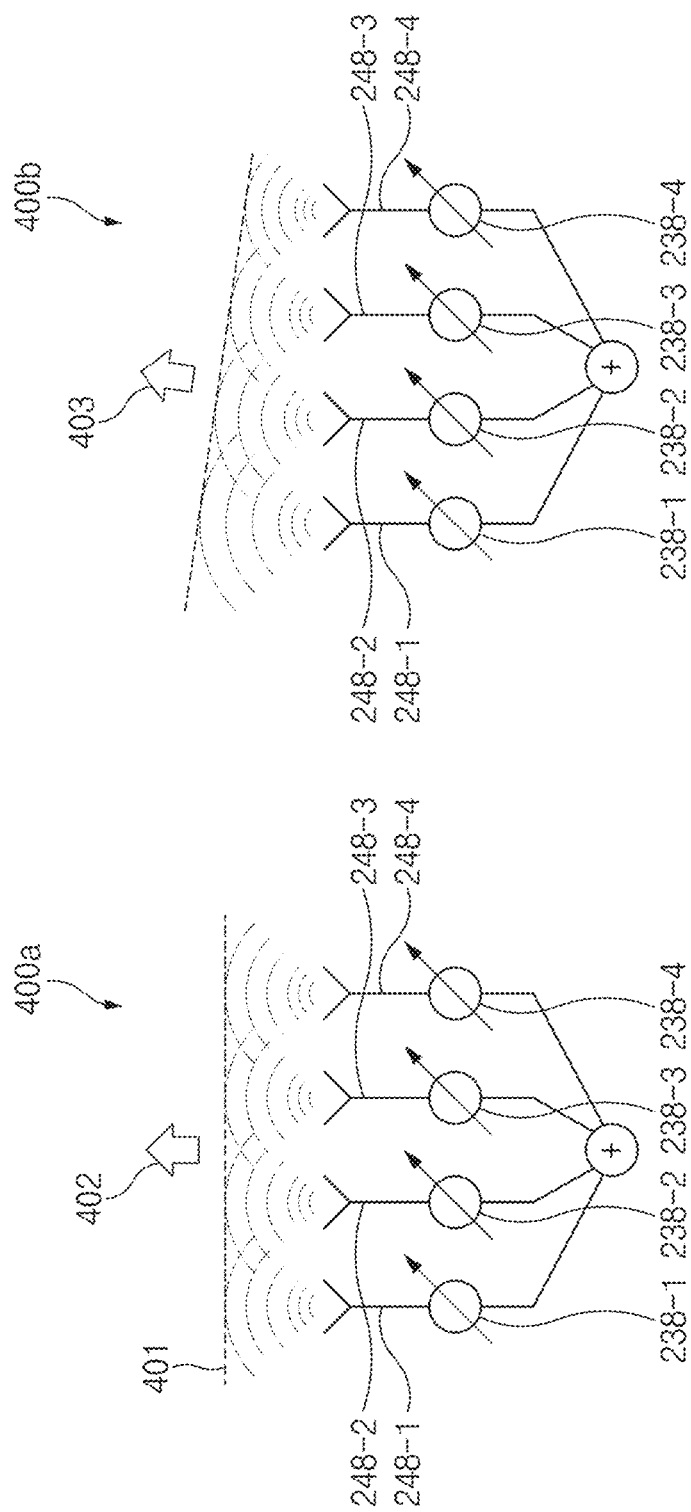
FIG. 4B illustrates an operation of performing beamforming by using phase shifters, according to various embodiments.

FIG. 4B illustrates an operation of performing beamforming by using phase shifters (e.g., 238-1, 238-2, 238-3, and 238-4), according to various embodiments.

Figure 13A:
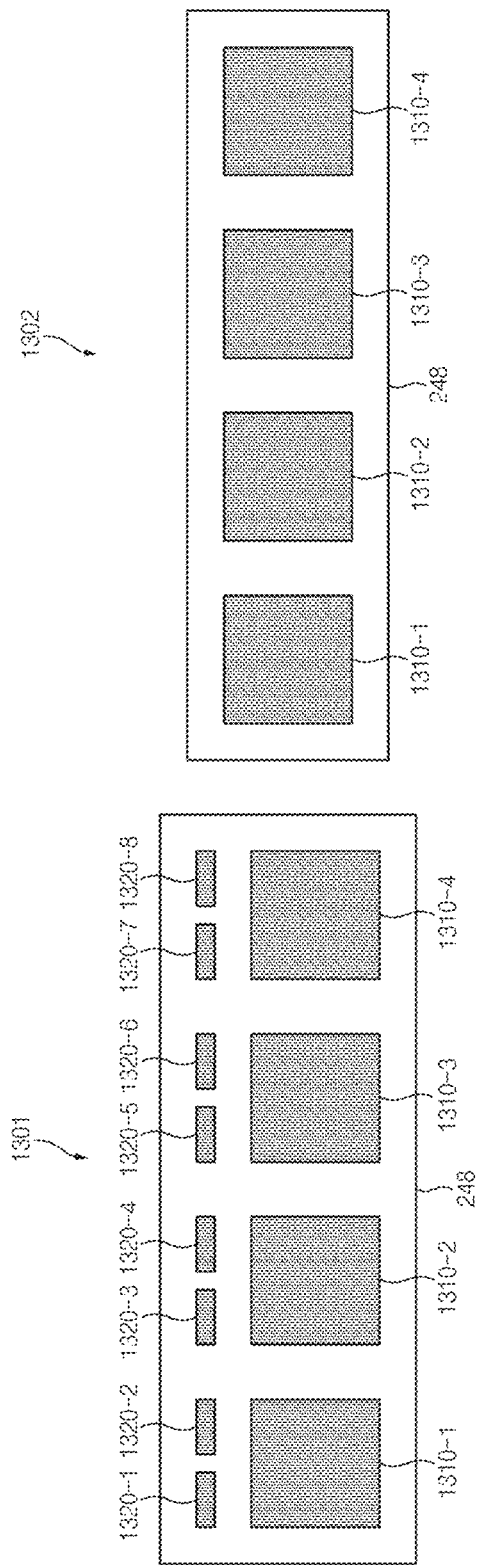
FIG. 13A illustrates an example of an antenna array, according to various embodiments.
Figure 13B:
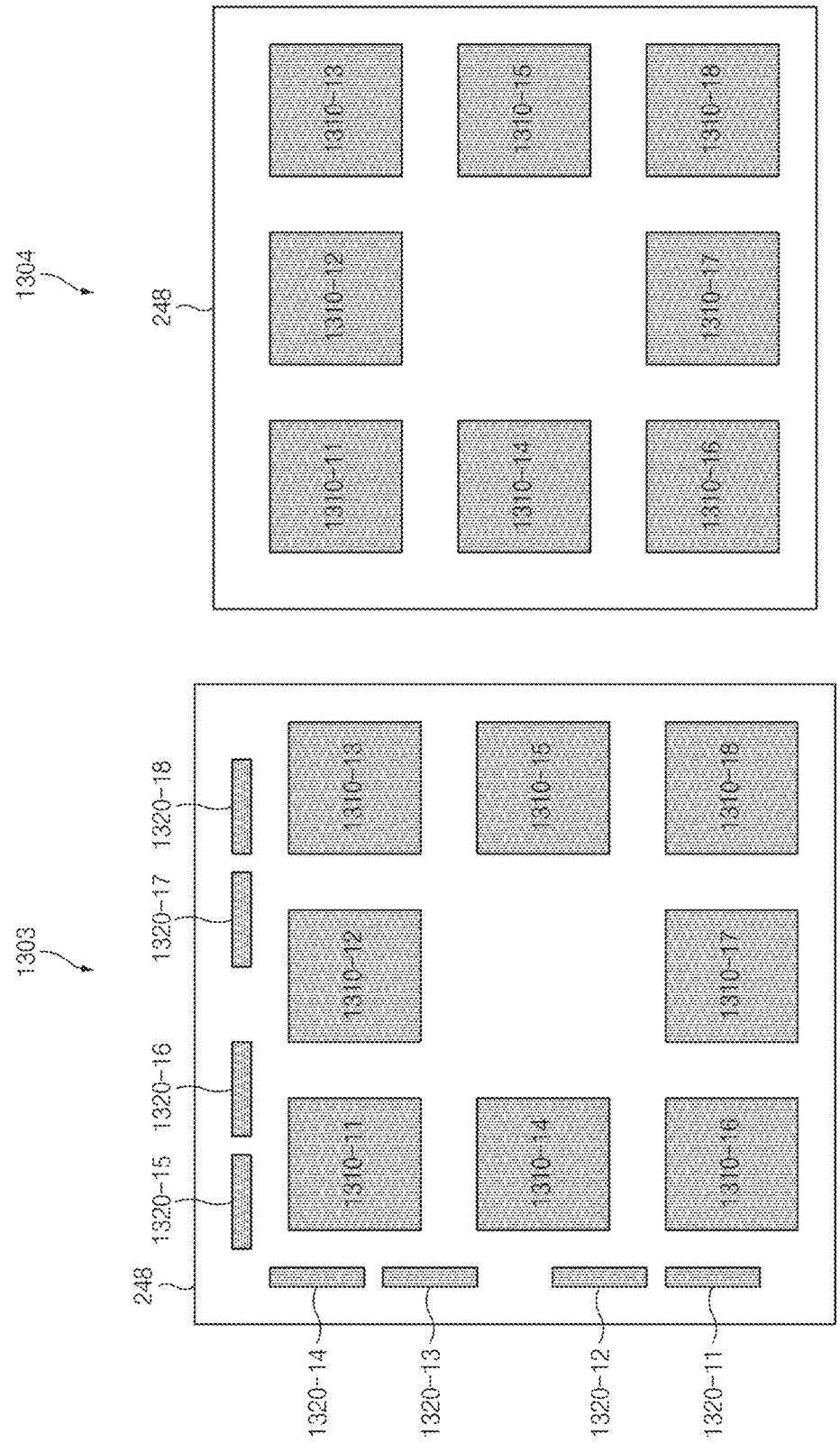
FIG. 13B illustrates another example of an antenna array, according to various embodiments.
Figure 13C:
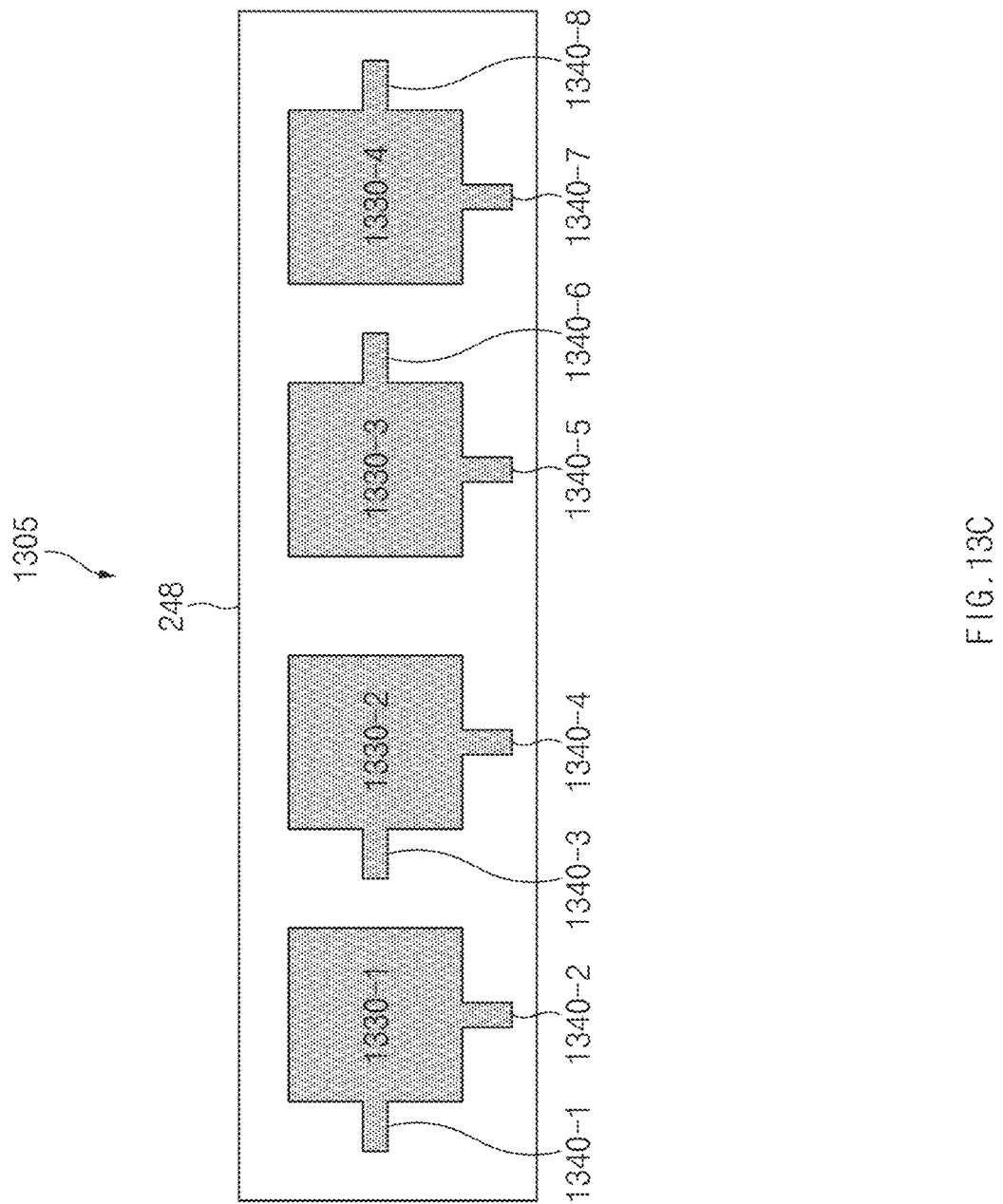
FIG. 13C illustrates another example of an antenna array, according to various embodiments.

Referring to FIG. 4B, phase shifters (e.g., 238-1, 238-2, 238-3, and 238-4) may be at least a part of the phase shifters 238 of FIG. 2, and may perform an operation the same as or similar to that of a phase shifter (e.g., 463-1) of FIG. 4A. FIG. 4B shows an example where a plurality of antenna elements 248-1, 248-2, 248-3, and 248-4 form a 1×4 antenna array, but the number of antenna elements and a pattern of the antenna elements are not limited to the example illustrated in FIG. 4B. For example, as illustrated in FIGS. 13A to 13C, the number of antenna elements and a pattern of the antenna elements may be variously changed.

According to an embodiment, an electronic device (e.g., the electronic device 101 or the communication module 190 of FIG. 1) may control the phase shifters (e.g., 238-1, 238-2, 238-3, and 238-4) such that a signal (or a radio wave) faces a specific direction.

For example, in operation 400a, the electronic device 101 may control the phase shifters (e.g., 238-1, 238-2, 238-3, and 238-4) such that phases of signals output from the plurality of antenna elements 248-1, 248-2, 248-3, and 248-4 are the same (e.g., 0 degree). In this case, because a wave front 401 of radio waves output from the plurality of antenna elements 248-1, 248-2, 248-3, and 248-4 faces a first direction 402, a wavelength strength of a signal (or an intensity of a signal) may be strong in the first direction 402.

For another example, in operation 400b, the electronic device 101 may control the phase shifters (e.g., 238-1, 238-2, 238-3, and 238-4) such that signals output from the plurality of antenna elements 248-1, 248-2, 248-3, and 248-4 are delayed every 45 degrees. In this case, because the wave front 401 of radio waves faces a second direction 403, a wavelength strength of a signal (or an intensity of a signal) may be strong in the second direction 402.

Through the above principle, the third antenna module 246-2 may support a more accurate resolution than the camera module 180 (e.g., an RGB sensor or an IR sensor).

Figure 5A:
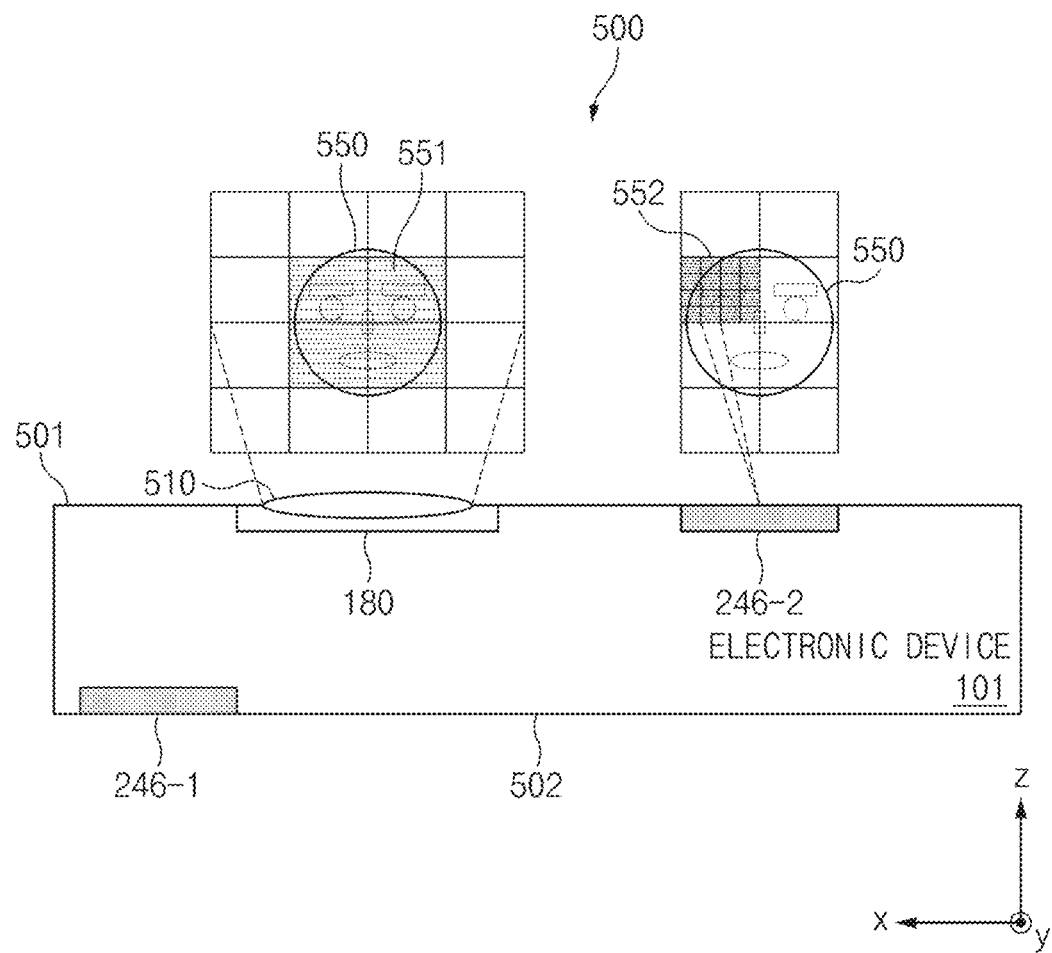
FIG. 5A illustrates an operation of detecting an external object by using a third antenna module, according to various embodiments.

FIG. 5A illustrates an operation of detecting an external object 550 by using the third antenna module 246-2, according to various embodiments.

Referring to FIG. 5A, in environment 500, the electronic device 101 may detect the external object 500 (e.g., a face of a user). FIG. 5A shows an operation of detecting the face of the user as an example of an external object, but according to an embodiment, the external object may include a part (e.g., a finger or a body type) of the user's body or a gesture of the user, as well as the face of the user.

According to an embodiment, the third antenna module 246 may be disposed at a location adjacent to the camera module 180. For example, when the camera module 180 is disposed such that at least one lens 510 of the camera module 180 is exposed through a first surface 510 (e.g., a front part) of the electronic device 101, the third antenna module 246-2 may be disposed in a first region (e.g., an inner space of the electronic device 101) belonging to the first surface 510. Embodiments where the third antenna module 246-2 is disposed in the first region of the electronic device 101 will be described with reference to FIGS. 8, 10A, 10B, 10C, 10D, 11A, and 11B. According to an embodiment, to make the efficiency of wireless communication high, the third antenna module 246-1 may be disposed in a second region (e.g., an inner space of the electronic device 101) belonging to a second surface 520 different from the first surface 510.

According to an embodiment, the electronic device 101 may detect the external object 550 by using the camera module 180. For example, the electronic device 101 may obtain an image associated with a space where the external object 550 is located, and may determine a region (e.g., 551) of the obtained image, in which the external object 550 exists.

According to an embodiment, the electronic device 101 may analyze the region, in which the external object 550 exists, in more detail by using the third antenna module 246-2. For example, the electronic device 101 may transmit a beamforming signal in a direction corresponding to an axis of the at least one lens 510 through the third antenna module 246-2. The electronic device 101 may obtain liveness information or depth information of the external object 550 through a beamforming signal reflected from a portion (e.g., 552) of the region where the external object 550 exists. Because the location where the third antenna module 246-2 is disposed may be spaced from the location where the camera module 180 is disposed, the electronic device 101 may determine a direction in which the beamforming signal is transmitted, in consideration of a location of the region (e.g., 551) detected through the camera module 180 and a distance between the third antenna module 246-2 and the camera module 180. An embodiment in which there is determined a direction in which a beamforming signal is transmitted will be described with reference to FIG. 15.

According to an embodiment, the electronic device 101 may perform user authentication by using at least one of the obtained liveness information or the obtained depth information. For example, when the external object 550 (e.g., a face) analyzed through the camera module 180 and the third antenna module 246-2 is matched with a face of the user registered in advance at the electronic device 101, an unlock function stored in the electronic device 101 may be performed.

Figure 5B:
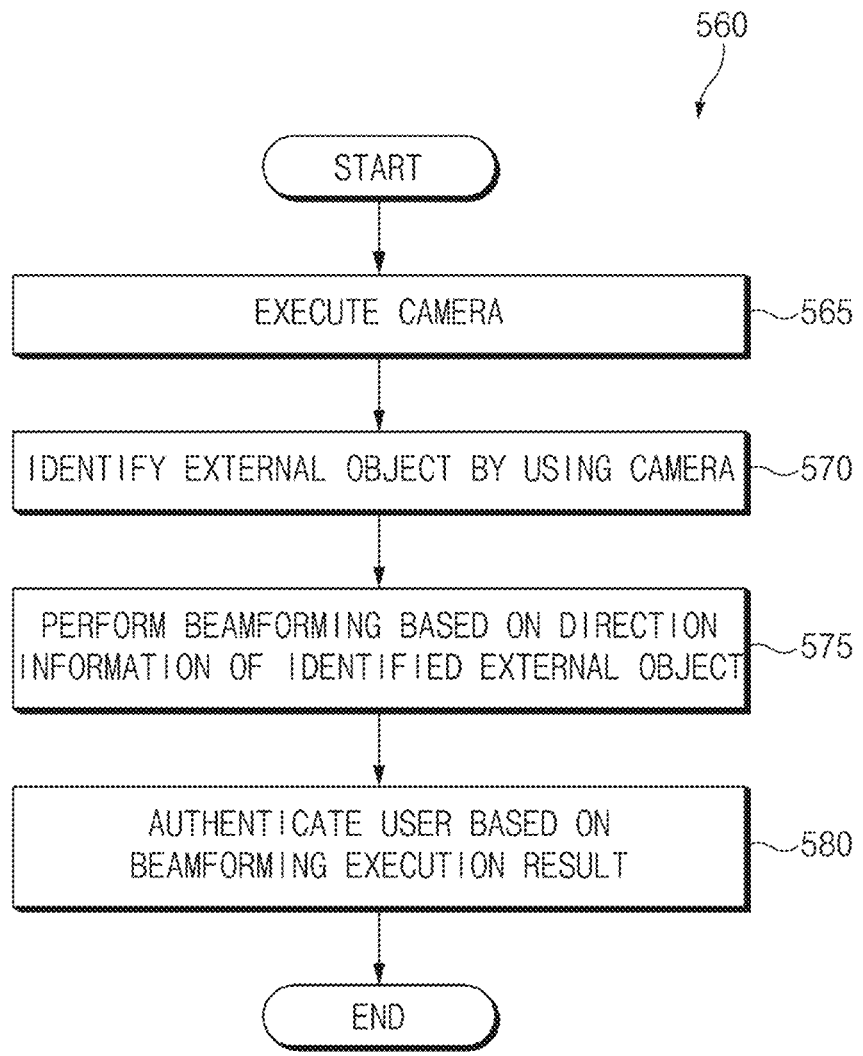
FIG. 5B illustrates an operation flowchart of an electronic device detecting an external object by using a third antenna module, according to various embodiments.

FIG. 5B illustrates an operation flowchart of the electronic device 101 detecting an external object by using a third antenna module, according to various embodiments.

Returning to FIG. 9, in operation 565 of the operation flowchart 560, the electronic device 101 may execute a camera (e.g., the camera module 180 of FIG. 5A). According to an embodiment, the electronic device 101 may perform operation 565 based on whether a function executed at the electronic device 101 uses the camera. For example, when the function executed at the electronic device 101 is a function (e.g., a user authentication application) using the camera, the electronic device 101 may perform operation 565. When the function executed at the electronic device 101 does not use the camera, the electronic device 101 may terminate an algorithm.

In operation 570, the electronic device 101 may identify or detect the external object (e.g., a part of the user's body, for example, a face, a hand, or a body type) by using the camera. The electronic device 101 according to various embodiments may identify a region corresponding to the part of the user's body (e.g., the external object 550 of FIG. 5A) from an image obtained by using the camera. In an embodiment, the electronic device 101 may perform recognition on the face.

In operation 575, the electronic device 101 may perform beamforming based on direction information of the identified external object (e.g., direction information about the region 551 where the external object 550 of FIG. 5A exists) (e.g., an azimuth angle or an elevation angle). According to an embodiment, the electronic device 101 may identify a location of the region corresponding to the face from at least a portion (e.g., a face) of the external object by using the camera. The electronic device 101 may perform beamforming in a direction corresponding to the location of the region corresponding to the face. According to an embodiment, the electronic device 101 may perform beamforming by outputting a signal in a specified frequency band in the direction corresponding to the location of the external object by using the third antenna module 246-2.

In operation 580, the electronic device 101 may perform user authentication based at least on a result of performing the beamforming. According to an embodiment, the electronic device 101 may authenticate the user by using the external object identified in operation 570 and information (e.g., liveness information or depth information) about the external object obtained through the result of the beamforming performed in operation 575. For example, the electronic device 101 may authenticate the user by using image information corresponding to the user's face obtained through the camera and the liveness information or depth information obtained by performing the beamforming. In another embodiment, the electronic device 101 may determine whether a result of the face recognition performed in operation 570 is correct, based on the liveness information or the depth information.

Figure 6:
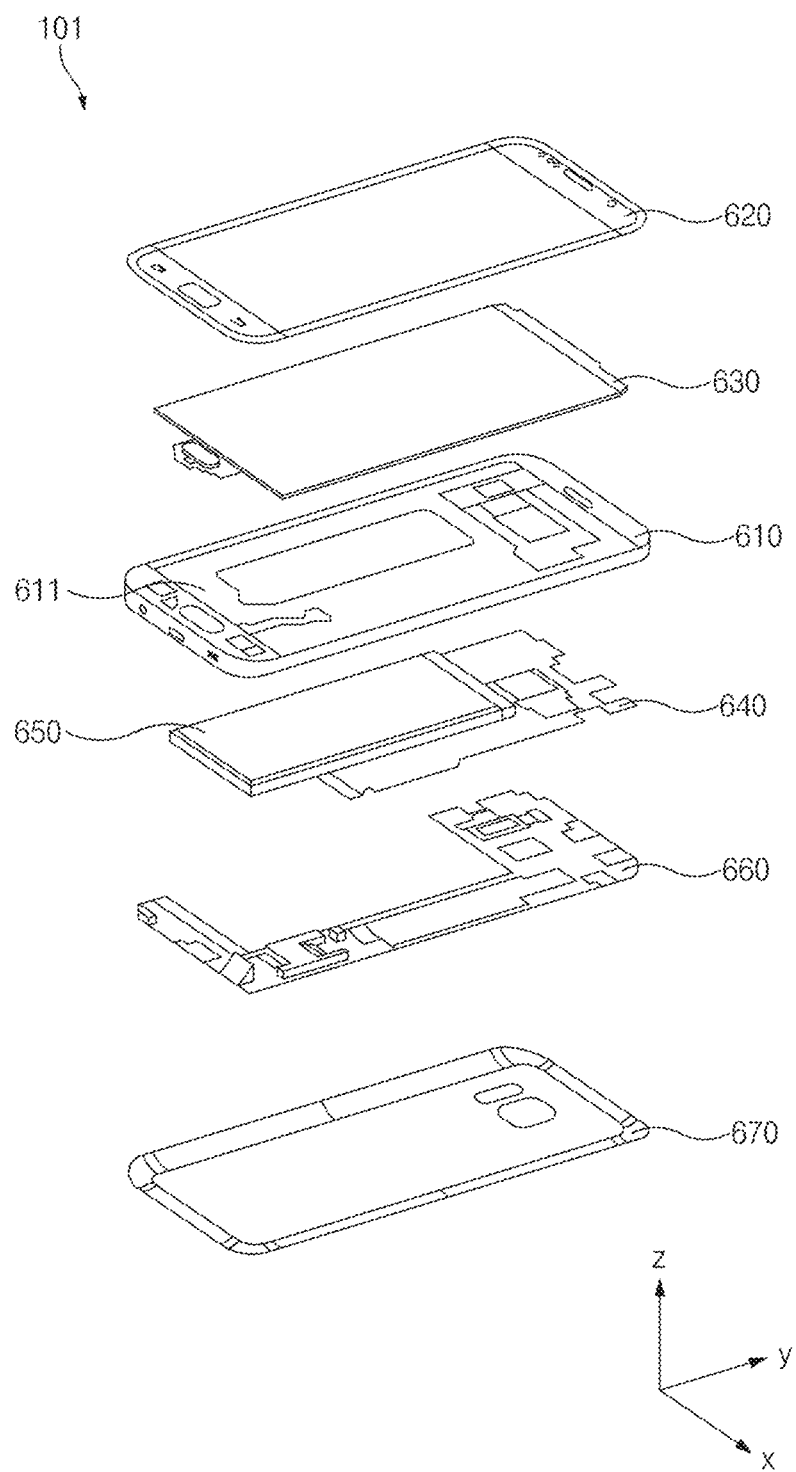
FIG. 6 is an exploded perspective view of an electronic device, according to various embodiments.

FIG. 6 is an exploded perspective view of the electronic device 101 according to various embodiments. FIG. 6 is a drawing for describing locations where the third antenna modules 246-1, 246-2, 246-3, and 246-4 are disposed, with reference to the z-axis of a three-dimensional coordinate system.

Referring to FIG. 6, the electronic device 101 may include a side bezel structure 610, a first support member 611 (e.g., a bracket), a front plate 620 (e.g., a window glass), a display 630 (e.g., at least a portion of the display device 160 of FIG. 1), a printed circuit board 640, a battery 650 (e.g., the battery 189 of FIG. 1), a second support member 660 (e.g., a rear case), and a back plate 670. In any embodiment, the electronic device 101 may not include at least one (e.g., the first support member 611 or the second support member 660) of the components or may further include any other component. At least one of the components of the electronic device 101 may be the same as or similar to at least one of the components of the electronic device 100 of FIG. 1, and thus, additional description will be omitted to avoid redundancy.

According to an embodiment, the first support member 611 may be disposed within the electronic device 101 so as to be connected with the side bezel structure 610, or may be integrally formed with the side bezel structure 610. The first support member 611 may be formed of, for example, a metal material and/or a nonmetal material (e.g., polymer). The display 630 may be coupled to one surface of the first support member 611, and the printed circuit board 640 may be coupled to an opposite surface of the first support member 611. Components (e.g., the processor 120, the memory 130, and/or the interface 177) of the electronic device 101 illustrated in FIG. 1 may be mounted on the printed circuit board 640.

According to an embodiment, because a signal in an ultra-high frequency band has low transmittance, the signal may be attenuated by components (e.g., the display 630, the printed circuit board 640, or the battery 650) of the electronic device 101.

According to an embodiment, the electronic device 101 may dispose a third antenna module (e.g., at least one of 246-1, 246-3, or 246-4), which is configured to perform wireless communication, at a back part thereof (e.g., between the printed circuit board 640 and the back plate 670) for the purpose of making a propagation range of wireless communication wide; when the side bezel structure 610 is formed of a metal material, the electronic device 101 may dispose the third antenna module (e.g., at least one of 246-1, 246-3, or 246-4) in the form of an antenna housing.

According to an embodiment, the electronic device 101 may dispose the third antenna module 246-2 at a front part of the electronic device 101 (e.g., at least a portion of the front plate 620, between the front plate 620 and the display 630, or at least a portion of the display 630) such that the third antenna module 246-2 configured to detect the external object 550 is adjacent to a front camera (e.g., at least a part of the camera module 180) disposed on a front surface (e.g., a +z-axis direction) of the electronic device 101. According to another embodiment, the electronic device 101 may dispose the third antenna module 246-2 at a back part of the electronic device 101 such that the third antenna module 246-2 is adjacent to a rear camera (e.g., at least a part of the camera module 180) disposed on a back surface (e.g., a −z-axis direction) of the electronic device 101.

Figure 7:
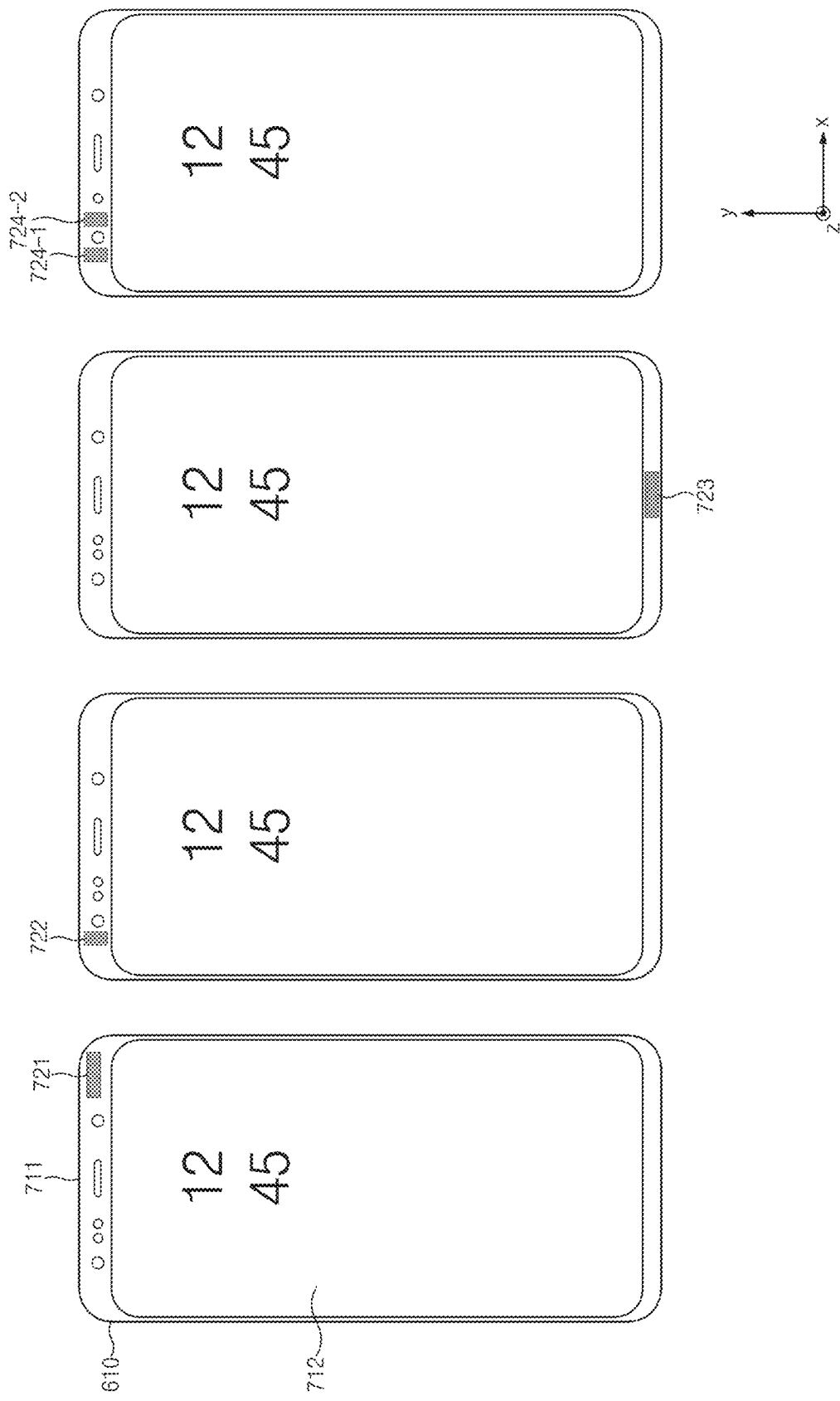
FIG. 7 illustrates an electronic device including a third antenna module at a front part thereof, according to various embodiments.

FIG. 7 illustrates the electronic device 101 including the third antenna module 246-2 at a front part thereof, according to various embodiments. FIG. 7 is a drawing for describing a location where the third antenna module 246-2 is disposed, with reference to an x-y plane of a three-dimensional coordinate system. In FIG. 7, regions (e.g., 721, 722, 723, 724-1, and 724-2) each indicating a location where the third antenna module 246-2 is disposed may correspond to an inner space of the electronic device 101.

Referring to FIG. 7, the front plate 620 may include a first region 711 where the display 630 is not driven and a second region 712 where the display 630 is driven. According to an embodiment, the first region 711 may be referred to as a "bezel region" or a "black matrix (BM) region".

According to an embodiment, the third antenna module 246-2 may be disposed in an inner space of the electronic device 101, which corresponds to the first region 711. For example, the third antenna module 246-2 may be disposed in an inner space corresponding to an upper right end (e.g., 721), an upper left end (e.g., 722), or a lower end (e.g., 723) of the first region 711. In the case where the third antenna module 246-2 configured to detect an external object (e.g., 550) is provided in plurality, the plurality of third antenna modules 246-2 may be disposed in regions (e.g., 724-1 and 724-2) spaced from each other.

Figure 8:
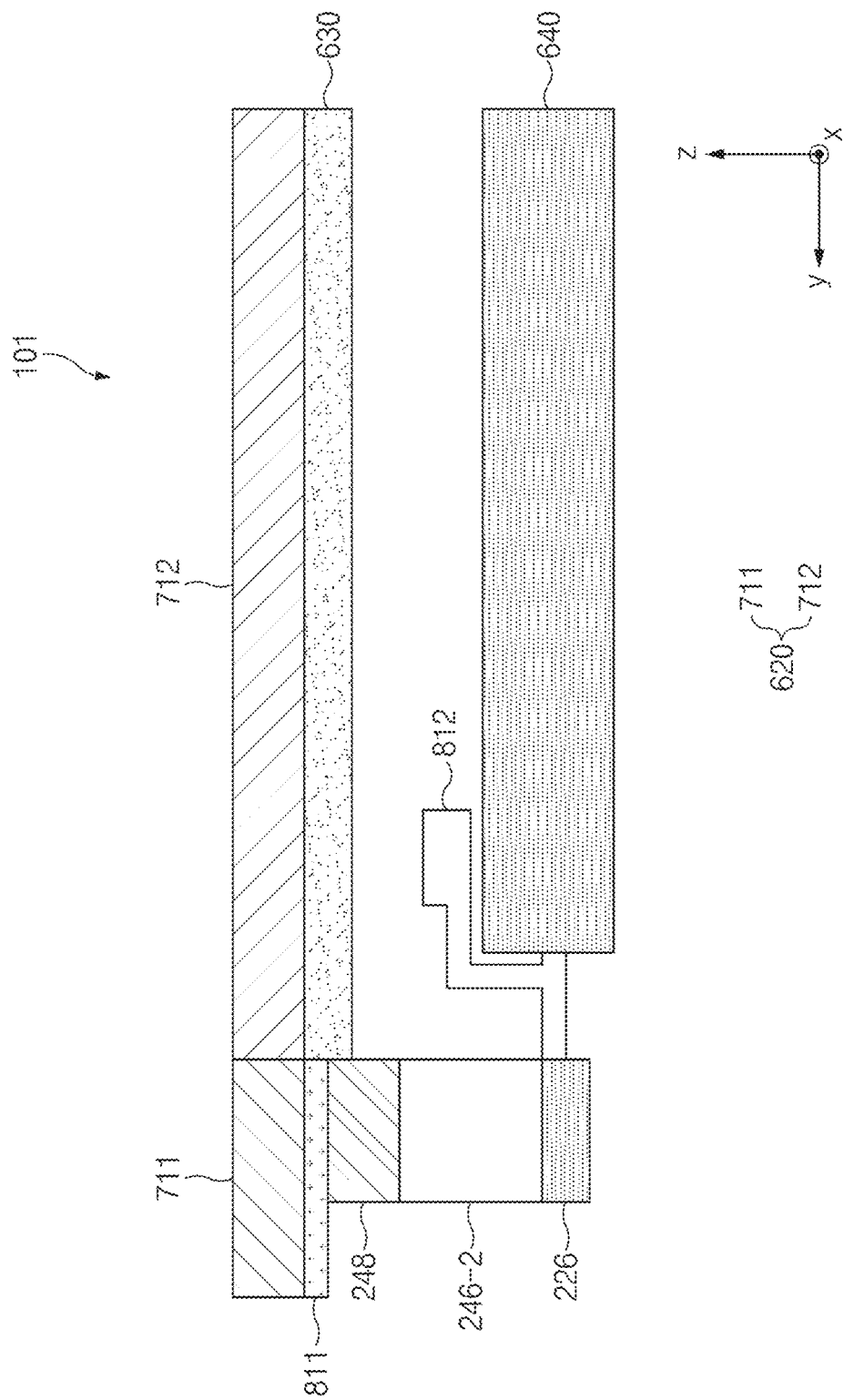
FIG. 8 is a cross-sectional view of an electronic device including a third antenna module at a black matrix (BM) region, according to various embodiments.

FIG. 8 is a cross-sectional view of the electronic device 101 including the third antenna module 246-2 in a BM region, according to various embodiments.

Referring to FIG. 8, the third antenna module 246-2 may be disposed under the first region 711 of the front plate 620 except for the second region 712 being in contact with the display 630. According to an embodiment, the third antenna module 246-2 may be connected with the first region 711 through a printing (or adhesive) material 811. According to an embodiment, to reduce a space where components are disposed, the third antenna module 246 may include the antenna array 248 on a first surface (e.g., a surface facing the +z-axis) thereof and may include the third RFIC 226 on a second surface (e.g., a surface facing the -z-axis) thereof. The electronic device 101 may transmit a signal in the +z-axis direction by using the antenna array 248. According to an embodiment, the third RFIC 226 may be connected with the printed circuit board 640 through a connection material 812.

Figure 9A:
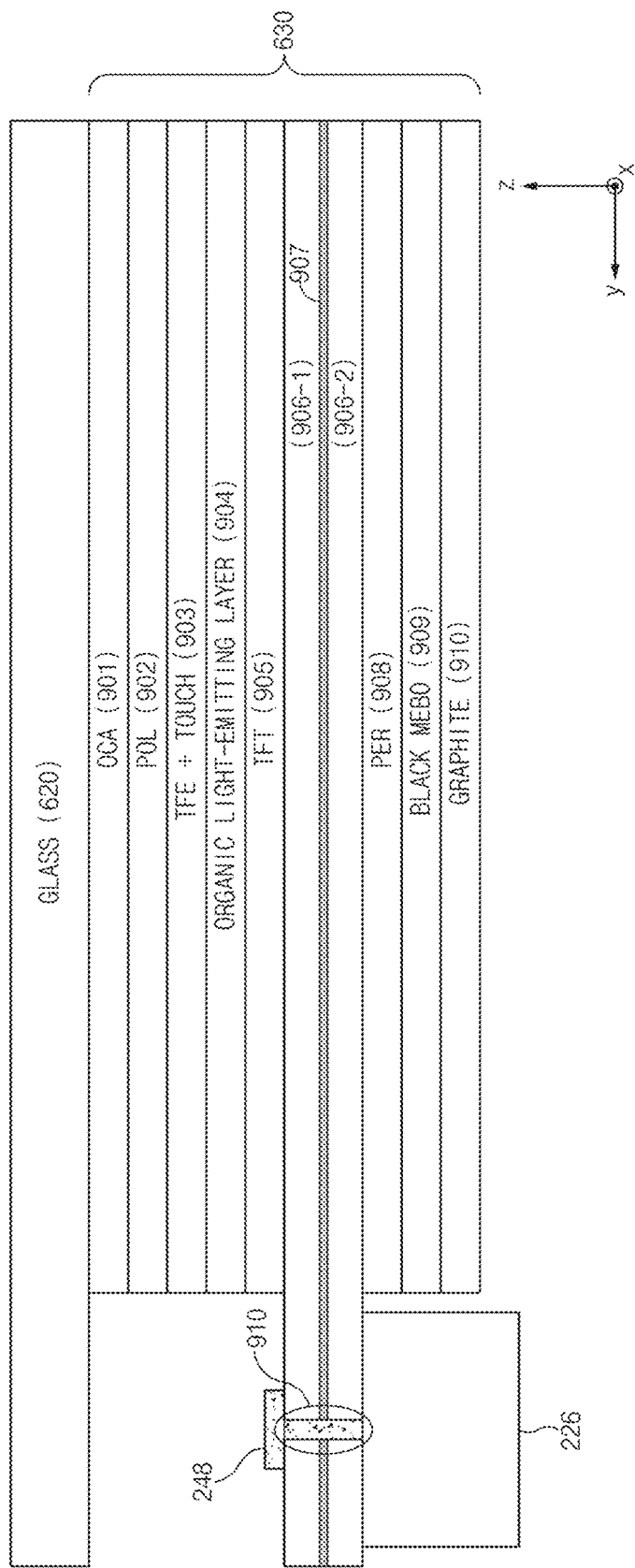
FIG. 9A is a cross-sectional view of an electronic device including a third antenna module in at least a partial region of a display, according to various embodiments.

FIG. 9A is a cross-sectional view of the electronic device 101 including the third antenna module 246-2 in at least a partial region of the display 630, according to various embodiments.

When a sub-plate (e.g., sub PCB) forming the third antenna module 246-2 is disposed on a surface where the display 630 is disposed, a phenomenon (e.g., a dead space) that a partial region of the display 630 is viewed to be black may occur. To prevent the phenomenon, the electronic device 101 may dispose the sub-plate forming the third antenna module 246-2 in some layers of a plurality of layers forming the display 630.

Referring to FIG. 9A, the display 630 may include an optical clear adhesive (OCA) film 901, a polarizer (POL) 902, a thin film encapsulation (TFE) and touch sensor 903, an organic light-emitting layer 904, a thin film transistor (TFT) 905, a first polyimide (Pi) 906-1, a silicon nitride (SiNx) thin film 907, a second Pi 906-2, a poly ethylene terephthalate (PET) film 908, a black embo 909, and a graphite 910 in order from the top (e.g., a location adjacent to the front plate 620) to the bottom (e.g., the -z-axis). To reduce the dead space, the electronic device 101 may replace the sub-plate forming the third antenna module 246-2 with the first Pi 906-1, the SiNx 907, and the second Pi 906-2. For example, the electronic device 101 may connect the antenna array 248 and the third RFIC 226 by using a via 910 formed in at least a partial region of the first Pi 906-1, the SiNx 907, and the second Pi 906-2.

Figure 9B:
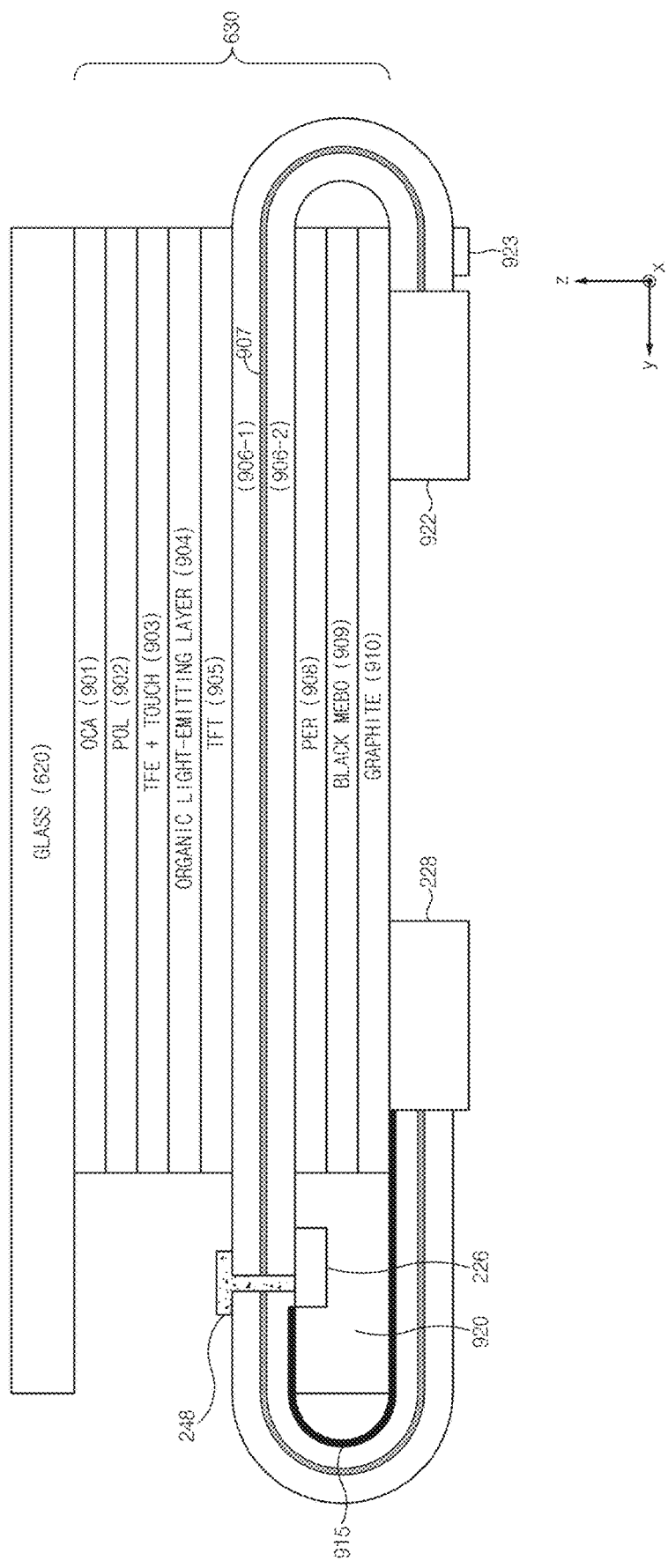
FIG. 9B is another cross-sectional view of an electronic device including a third antenna module in at least a partial region of a display, according to various embodiments.

FIG. 9B is another cross-sectional view of the electronic device 101 including the third antenna module 246-2 in at least a partial region of the display 630, according to various embodiments.

Referring to FIG. 9B, the fourth RFIC 228 may be disposed on a back surface (e.g., the -z-axis direction) of the display 630. A first portion (e.g., a +y-axis portion) of the first Pi 906-1, the SiNx 907, and the second Pi 906-2 for replacing the sub-plate of the third antenna module 246-2 may be bent toward a back surface of the display 630. The third RFIC 226 and the fourth RFIC 228 may be connected through an interface 915 (e.g., a cycloolefin polymer (COP) film) extended along the first portion of the bent films 906-1, 906-2, and 907. The first portion of the films 906-1, 906-2, 907 and the interface 915 may be bent in a direction for reducing the dead space. For example, the first portion of the films 906-1, 906-2, and 907 and the interface 915 may be bent in a direction (e.g., a z-axis direction) the same as a direction where a second portion (e.g., a -y-axis direction) of the films 906-1, 906-2, and 907 is bent to face a display controller 922 and a display driver integrated circuit (DDI) 923 disposed on the back surface of the display 630, or may be bent in a direction (e.g., a y-axis direction) different from a portion where the second portion of the films 906-1, 906-2, and 907 are bent.

According to an embodiment, the electronic device 101 may further include a shield 920 for protecting the third RFIC 226.

Figure 9C:
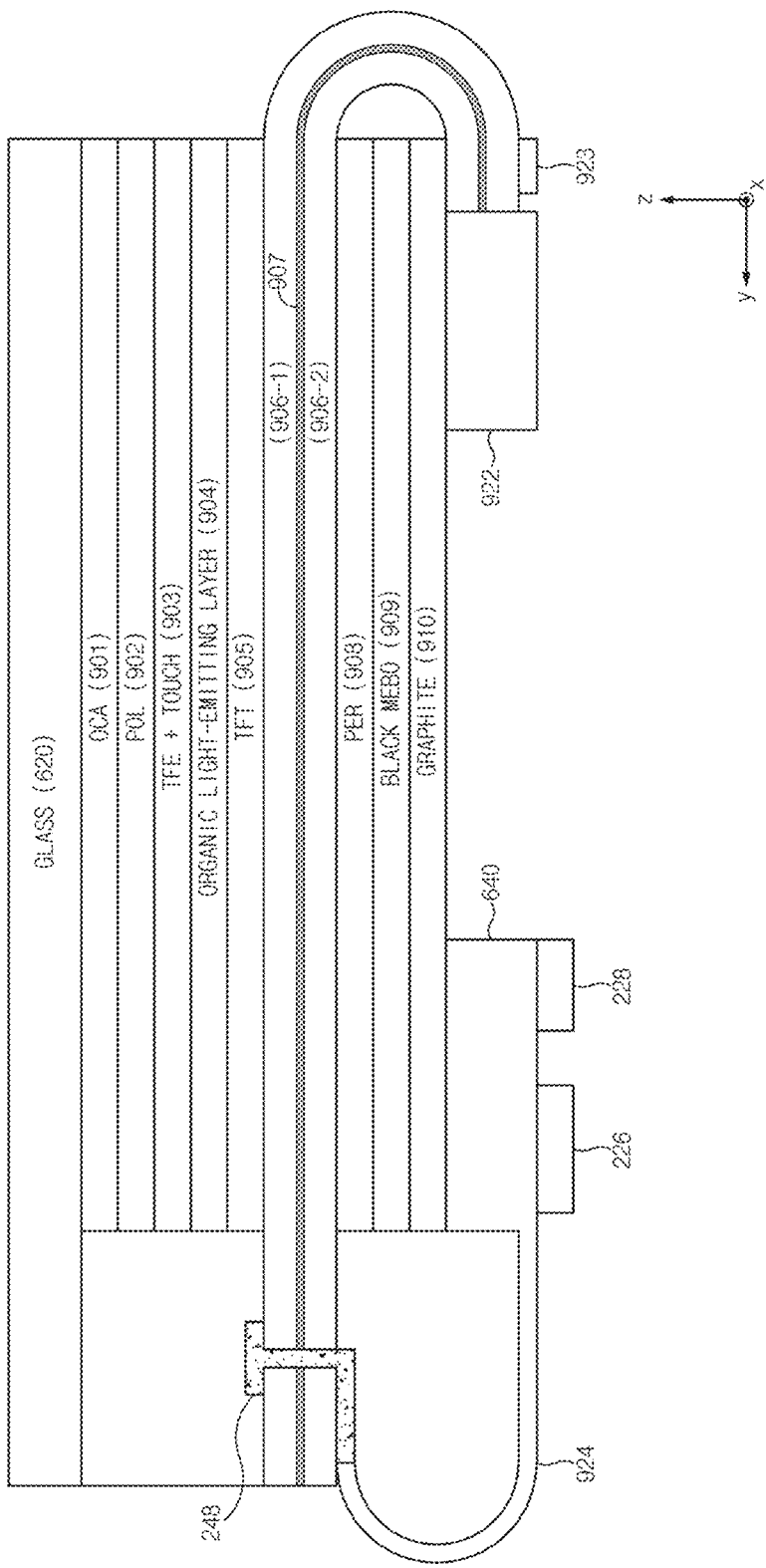
FIG. 9C is another cross-sectional view of an electronic device including a third antenna module in at least a partial region of a display, according to various embodiments.

FIG. 9C is another cross-sectional view of the electronic device 101 including the third antenna module 246-2 in at least a partial region of the display 630, according to various embodiments.

Referring to FIG. 9C, the third RFIC 226 and the fourth RFIC 228 may be disposed on one surface (e.g., a surface facing the -z-axis direction) of the printed circuit board 640. The electronic device 101 may connect the antenna array 248 and the third RFIC 226 through a separate interface 924 instead of extending the first portion of the films 906-1, 906-2, and 907. The interface 924 may include, for example, at least one of a flexible PCB (FPCB) or a COP film. According to an embodiment, the interface 924 may be extended up to the fourth RFIC 228. The interface 924 may be bent in a direction the same as the direction in which the interface 915 of FIG. 9B is bent.

Figure 9D:
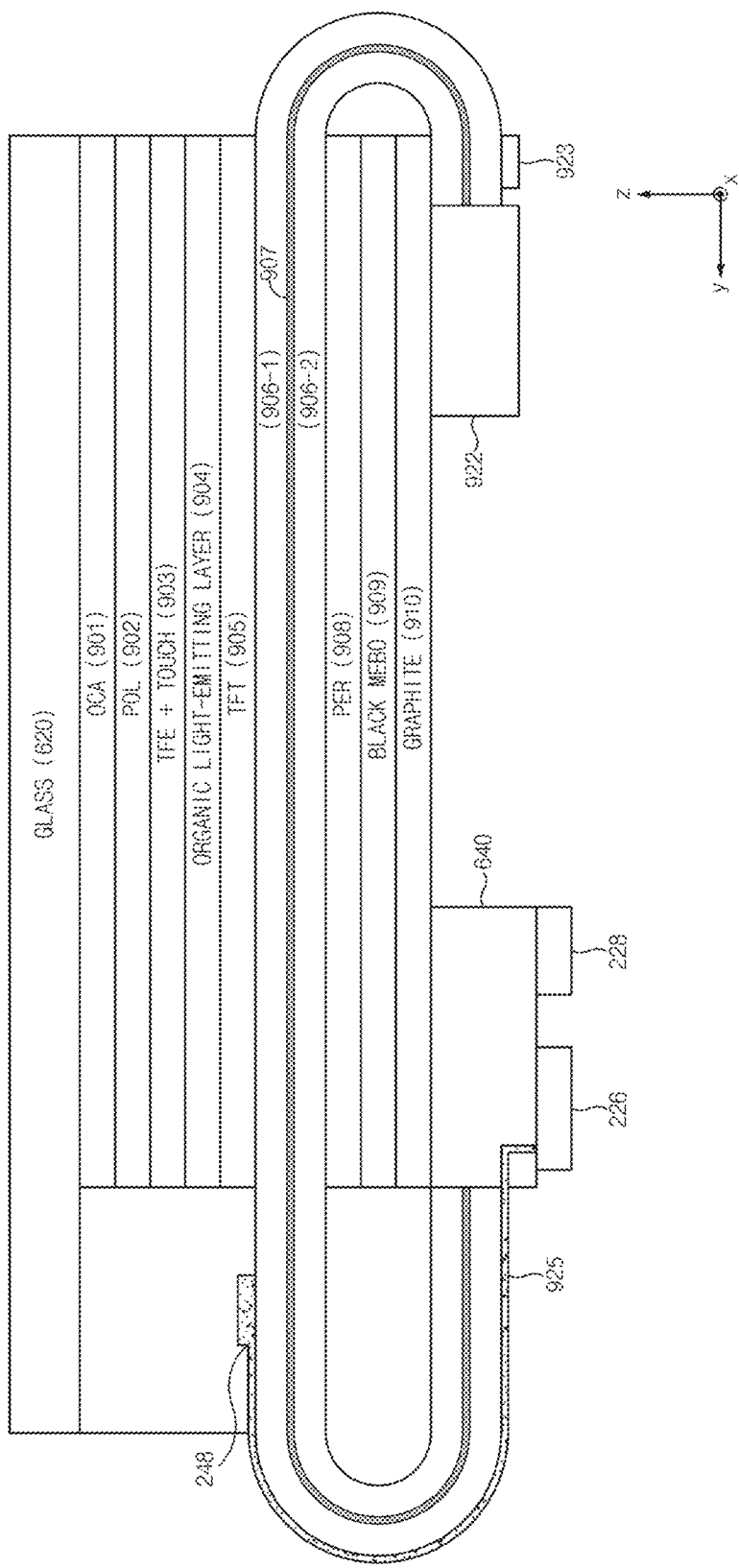
FIG. 9D is another cross-sectional view of an electronic device including a third antenna module in at least a partial region of a display, according to various embodiments.

FIG. 9D is another cross-sectional view of the electronic device 101 including the third antenna module 246-2 in at least a partial region of the display 630, according to various embodiments.

Referring to FIG. 9D, the antenna array 248 may be disposed on one surface (e.g., a surface facing the +z-axis direction) of the films 906-1, 906-2, and 907, and the third RFIC 226 and the fourth RFIC 228 may be disposed on a back surface (e.g., a surface facing the -z-axis direction) of the printed circuit board 640. The electronic device 101 may connect the antenna array 248 and the third RFIC 226 without the via 910. For example, the antenna array 248 may be connected with the third RFIC 226 (or the fourth RFIC 228) through an interface 925 extended along the films 906-1, 906-2, and 907 bent toward the back surface of the display 630.

Figure 10:
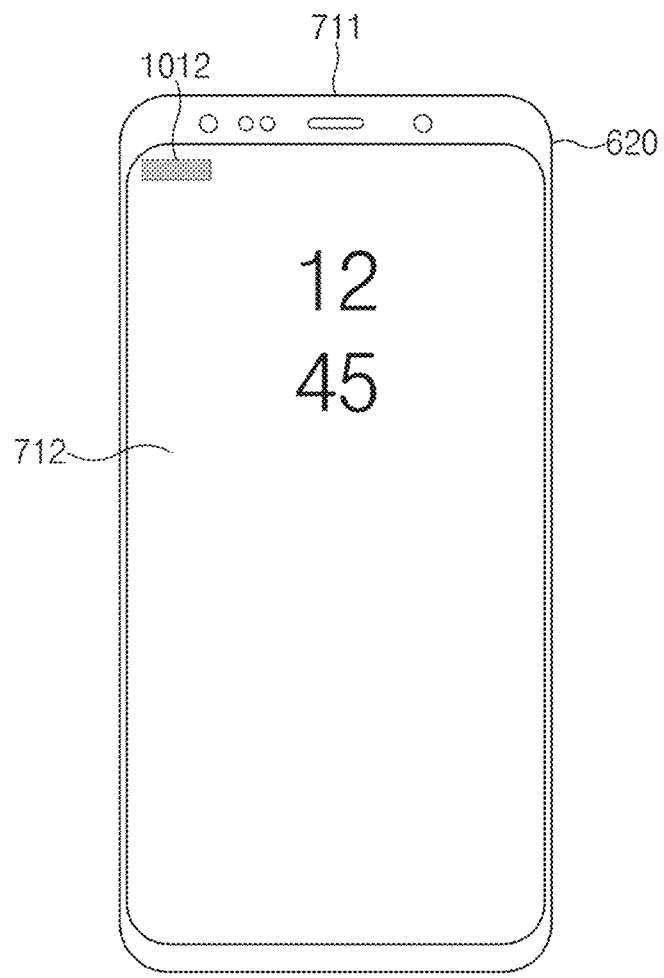
FIG. 10 illustrates an electronic device including a third antenna module at at least a portion of a region where a display is driven, according to various embodiments.

FIG. 10 illustrates the electronic device 101 including the third antenna module 246-2 at at least a portion of a region (e.g., the second region 712) where the display 630 is driven, according to various embodiments. FIG. 10 is a drawing for describing a location where the third antenna module 246-2 is disposed, with reference to an x-y plane of a three-dimensional coordinate system.

Referring to FIG. 10, the third antenna module 246-2 may be disposed in an inner space of at least a portion of the second region 712 where the display 630 is driven. The at least a portion of the second region 712 may include, for example, a periphery (e.g., 1012) of the second region 712.

Figure 11A:
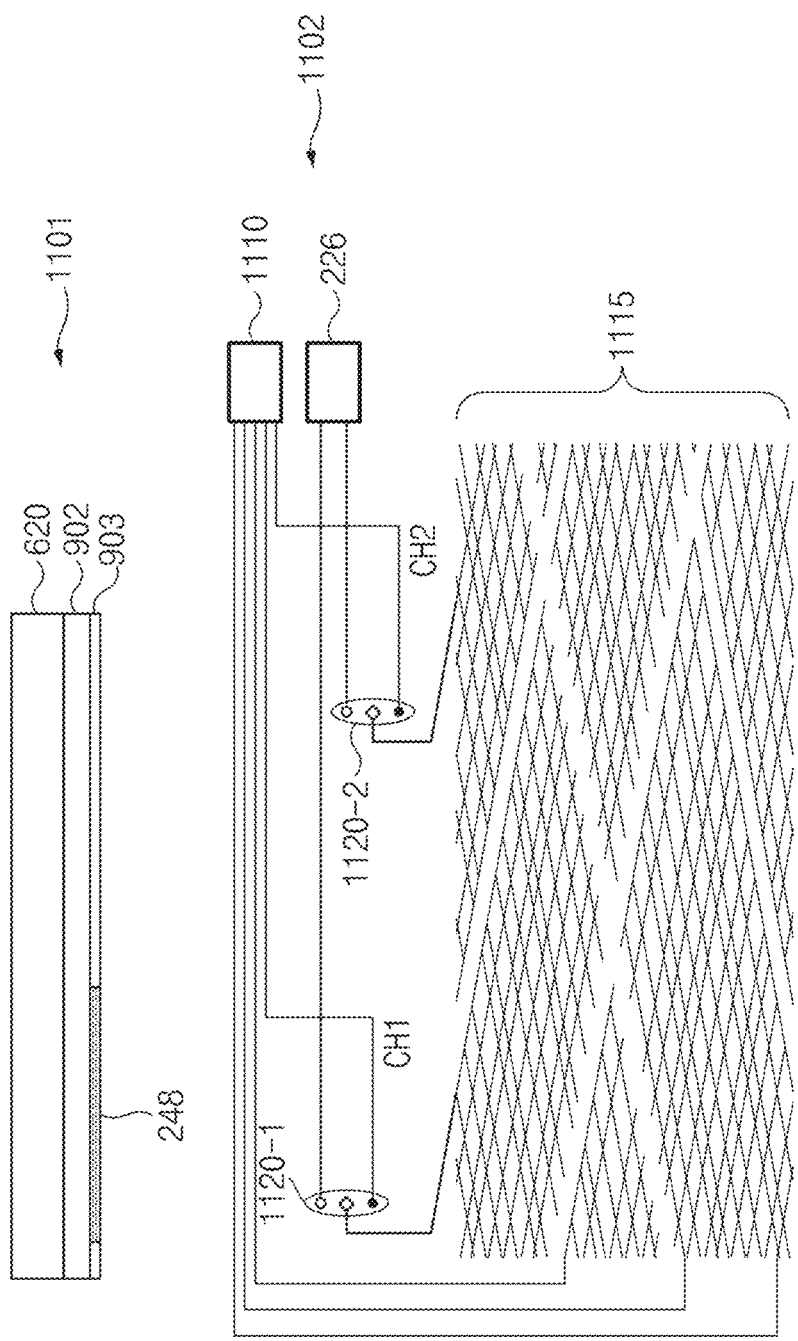
FIG. 11A illustrates a structure of an electronic device where a touch sensor and an antenna array form the same layer within a display, according to various embodiments.

FIG. 11A illustrates a structure of the electronic device 101 where the touch sensor 1003 and the antenna array 248 form the same layer within the display 630, according to various embodiments. A first drawing 1101 illustrates a cross-section view of the electronic device 101, and a second drawing 1102 illustrates a plan view of the electronic device 101.

Referring to the first drawing 1101 of FIG. 11A, the touch sensor 903 disposed on the bottom of the POL 902 may be formed in a metal mesh structure 1115 as illustrated in the second drawing 1102. The metal mesh structure 1115 may include, for example, at least one of sliver (Ag) or copper (Cu). The metal mesh structure 1115 may be implemented, for example, by using at least one of a self-cap manner or a mutual-cap manner.

According to an embodiment, the electronic device 101 may include the antenna array 248 in at least a partial region of the touch sensor 903. In this case, the antenna array 248 and the touch sensor 903 may share an electrode of the metal mesh structure 1115.

According to an embodiment, the metal mesh structure 1115 may be connected with the third RFIC 226 and a touch IC 1110. The electronic device 101 may selectively use a function of the touch sensor 903 and a function of the antenna array 248 by using a time-division manner. For example, an electrode pair of the metal mesh structure 1115 may be connected with the third RFIC 226 and the touch IC 1110 through switches (e.g., 1120-1 and 1120-2).

Figure 11B:
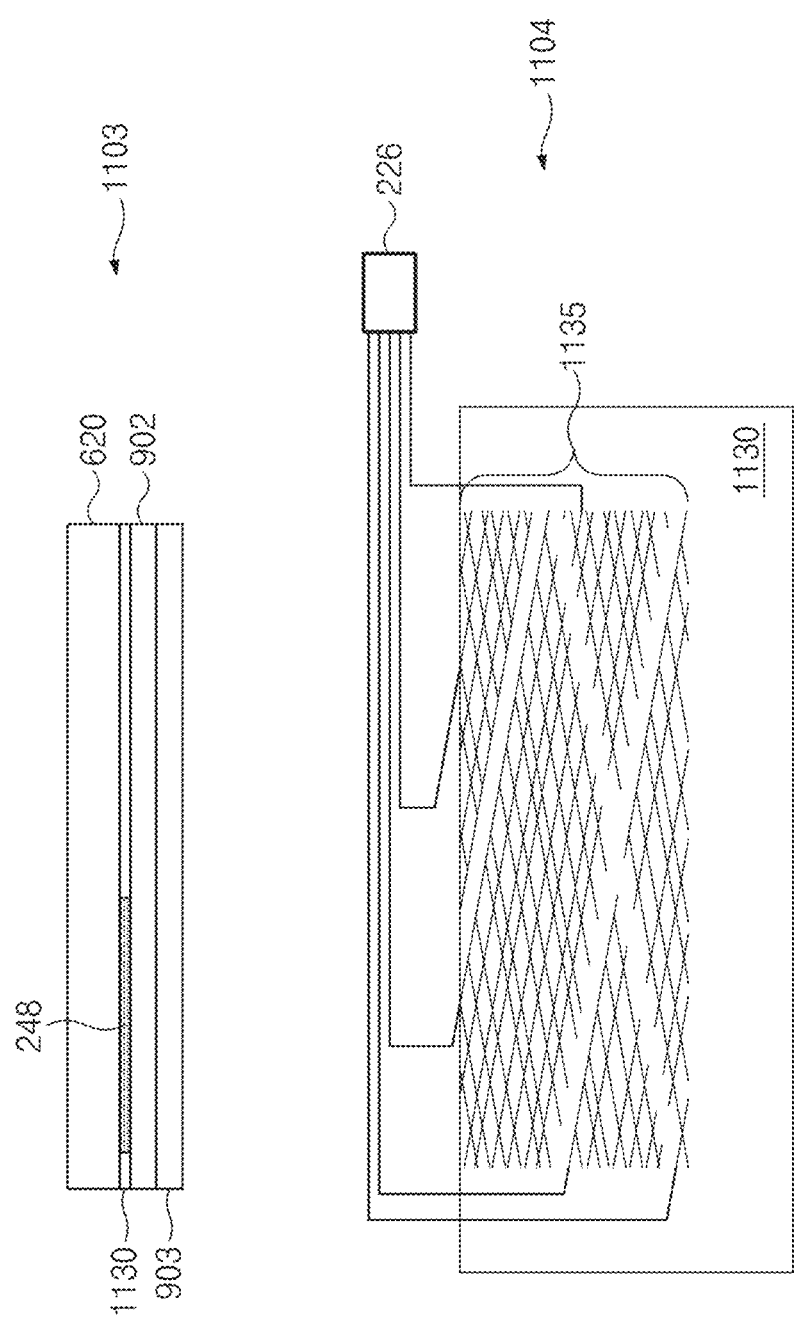
FIG. 11B illustrates a structure of an electronic device where a touch sensor and an antenna array form different layers within a display, according to various embodiments.

FIG. 11B illustrates a structure of the electronic device 101 where the touch sensor 903 and the antenna array 248 form different layers within the display 630, according to various embodiments. A third drawing 1103 illustrates a cross-section view of the electronic device 101, and a fourth drawing 1104 illustrates a plan view of the electronic device 101.

Referring to the third drawing 1103 of FIG. 11A, the electronic device 101 may further include a step compensation film 1130 (e.g., a PET) on the bottom of the front plate 620. The step compensation film 1130 may compensate for a step of the display 630. According to an embodiment, the electronic device 101 may include the antenna array 248 formed in a metal mesh structure 1135 in a partial region of the step compensation film 1130 as illustrated in the fourth drawing 1104. The metal mesh structure 1135 may include, for example, at least one of sliver (Ag) or copper (Cu). Because the antenna array 248 transmits or receives a signal, to make transmittance high, the step compensation film 1130 may be disposed on the top of the POL 902. According to an embodiment, the metal mesh structure 1135 may be electrically connected with the third RFIC 226.

Figure 12:
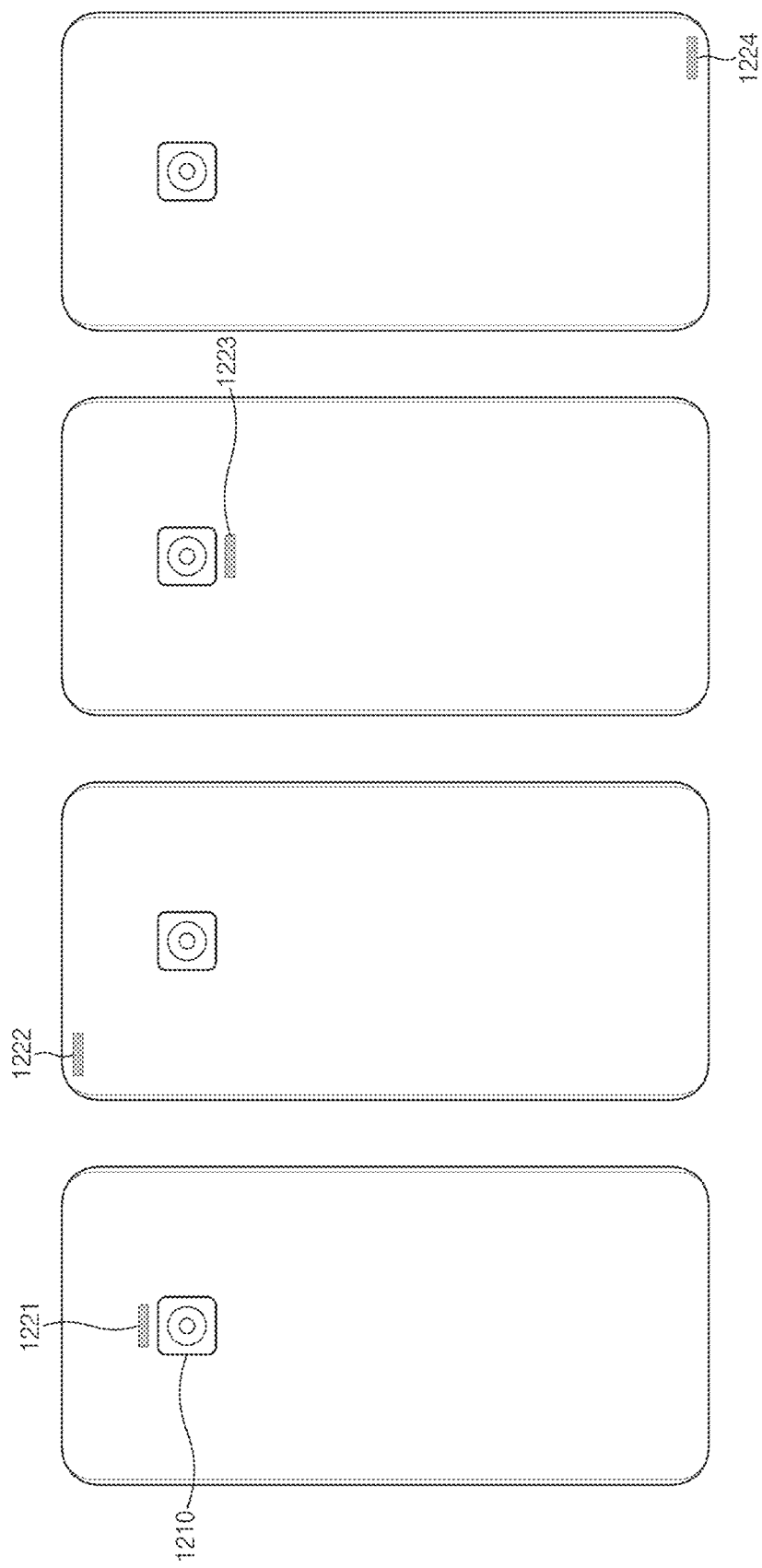
FIG. 12 illustrates an electronic device including a third antenna module at a back part thereof, according to various embodiments.

FIG. 12 illustrates the electronic device 101 including the third antenna module 246-2 at a front part thereof, according to various embodiments.

Referring to FIG. 12, the electronic device 101 may include the third antenna module 246-3 at a back part of the electronic device 101 for the purpose of detecting an external object located in front of a back surface of the electronic device 101 (e.g., in a direction where the back plate 670 of FIG. 6 faces). For example, the third antenna module 246-2 may be disposed at a location (e.g., 1221 or 1223) adjacent to a rear camera 1210 or may be disposed at a periphery (e.g., 1222 or 1224) of the electronic device 101.

FIGS. 13A to 13C illustrate examples of the antenna array 248, according to various embodiments.

Referring to FIG. 13A, the antenna array 248 may include a plurality of antenna elements forming one row (or column). For example, first antenna elements 1310-1, 1310-2, 1310-3, and 1310-4 may form a 1×4 array. According to an embodiment, the antenna array 248 may be formed in the shape of a first pattern 1301 including the first antenna elements 1310-1, 1310-2, 1310-3, and 1310-4 and second antenna elements 1320-1, 1320-2 . . . 1320-8, or may be formed in the shape of a second pattern 1302 including only the first antenna elements 1310-1, 1310-2, 1310-3, and 1310-4. According to an embodiment, the first antenna elements 1310-1, 1310-2, 1310-3, and 1310-4 may include a patch antenna, and the second antenna elements 1320-1, 1320-2 . . . 1320-8 may include a dipole antenna.

Referring to FIG. 13B, the antenna array 248 may include a plurality of antenna elements forming an n×n array (n being a natural number). According to an embodiment, the antenna array 248 may be formed in the shape of a third pattern 1303 including first antenna elements 1310-11, 1310-12 . . . 1310-18 and second antenna elements 1320-11, 1320-12 . . . 1320-18, or may be formed in the shape of a fourth pattern 1304 including only the first antenna elements 1310-11, 1310-12 . . . 1310-18.

Referring to FIG. 13C, the antenna array 248 may include a plurality of third antenna elements 1330-1, 1330-2, 1330-3, and 1330-4 configured to output a plurality of polarization signals. For example, the third antenna element 1330-1 may output a signal having a plurality of polarization (e.g., vertical polarization and horizontal polarization) by using signals received from a first feeding part 1340-1 and a second feeding part 1340-2.

Figure 14:
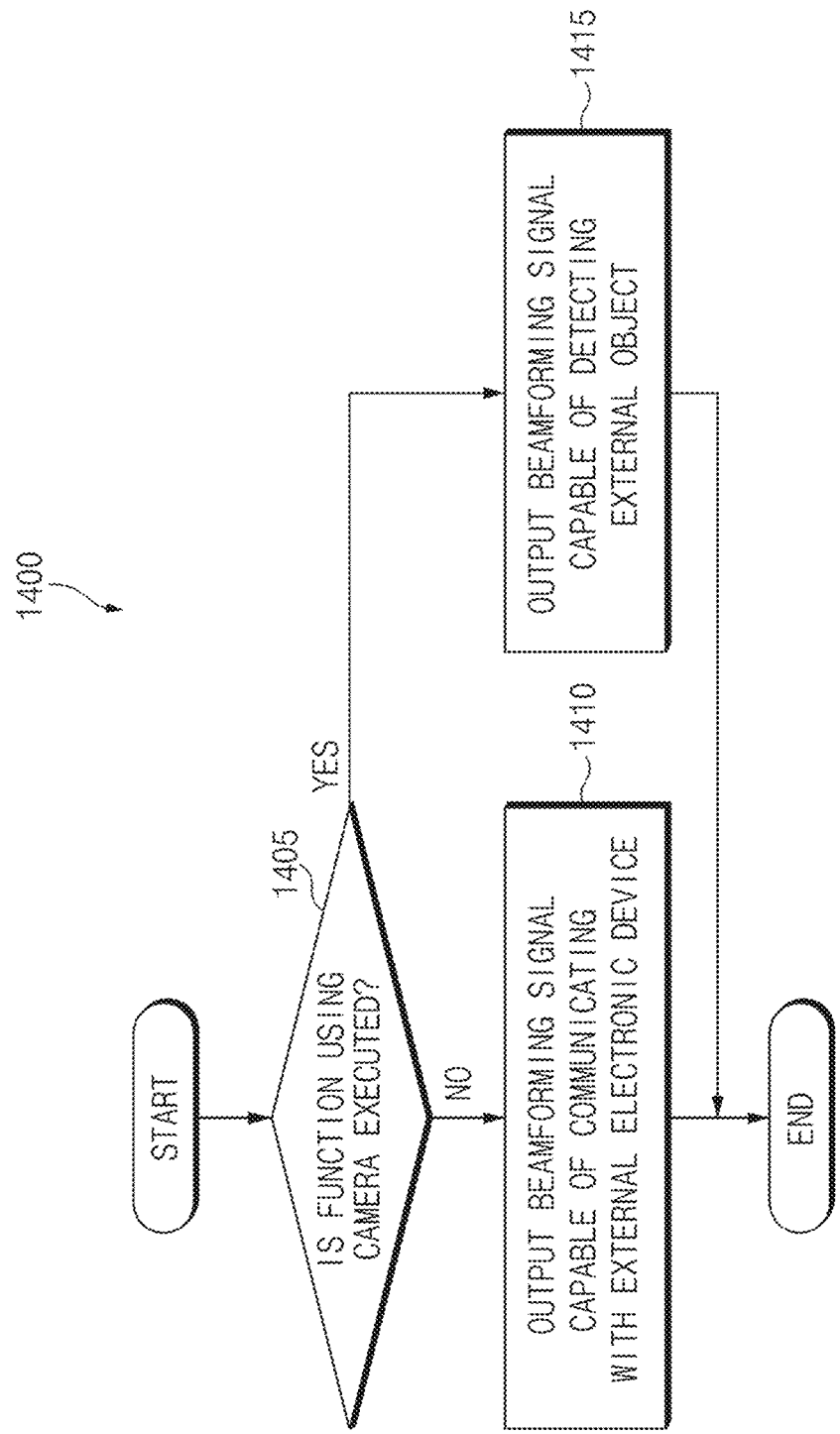
FIG. 14 illustrates an operation flowchart of an electronic device outputting a signal, according to various embodiments.

FIG. 14 illustrates an operation flowchart of the electronic device 101 outputting a signal, according to various embodiments. Operations illustrated in FIG. 14 may be performed by the electronic device 101 or a component (e.g., the processor 120 of FIG. 1) included in the electronic device 101.

Referring to FIG. 14, in operation 1405 of a method 1400, the electronic device 101 may determine (or identify) whether a function using a camera (e.g., the camera module 180) from among functions of the electronic device 101 is executed.

According to an embodiment, when the function using the camera is not executed, in operation 1410, the electronic device 101 may output a beamforming signal capable of communicating with an external electronic device through the third antenna module 246-2.

According to an embodiment, when the function using the camera is executed, in operation 1415, the electronic device 101 may output a beamforming signal capable of detecting an external object (e.g., the external object 550 of FIG. 5) through the third antenna module 246-2.

Figure 15:
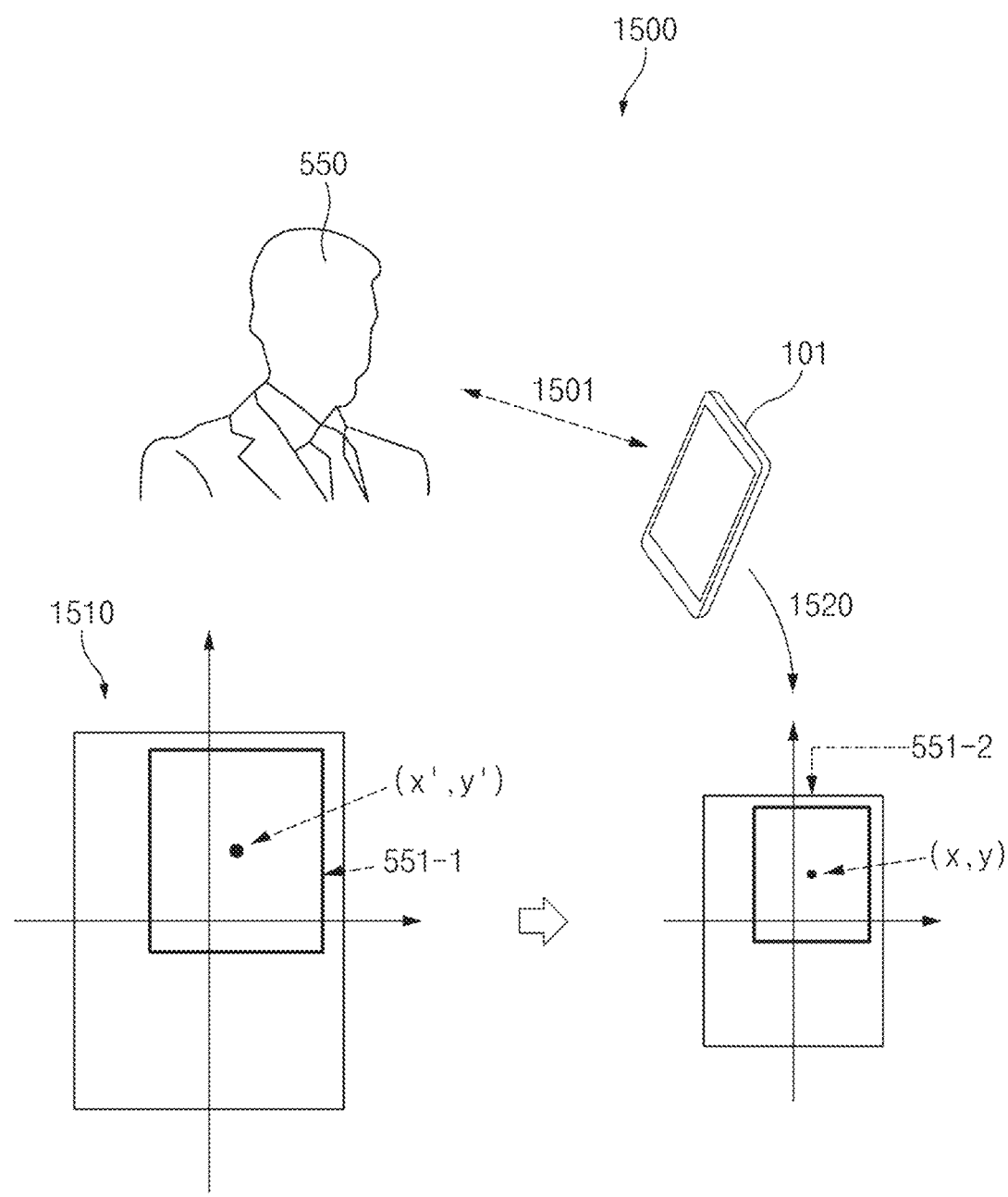
FIG. 15 illustrates an operation of an electronic device calculating a direction in which a beamforming signal is transmitted, according to various embodiments.

FIG. 15 illustrates an operation of the electronic device 101 calculating a direction in which a beamforming signal is transmitted, according to various embodiments.

Referring to FIG. 15, due to a magnification of the camera module 180 disposed at the electronic device 101, center coordinates (x', y') of a region (e.g., a portion 551-1 of a region 1510) where the external object 550 (e.g., a face of the user) actually exists and center coordinates (x, y) of a region (e.g., 551-2), which belongs to an image 1520 obtained by the camera module 180 and in which the external object 550 is present, may be different. The electronic device 101 may calculate the center coordinates (x', y') of the region where the external object 550 actually exists, by using Equation 1 below.

$$x' = \frac{x}{A}, y' = \frac{y}{B} \quad \text{Equation 1}$$

In Equation 1 above, "A" may mean a transverse magnification of the camera module 180, and "B" may mean a longitudinal magnification thereof.

According to an embodiment, in addition to the center coordinates, the electronic device 101 may calculate a landmark or a feature point of the image 1520 by using Equation 1 above.

According to an embodiment, the electronic device 101 may store coordinates (xmmWave, ymmWave) where the third antenna module 246-2 is disposed, in a memory (e.g., the memory 130 of FIG. 1). The electronic device 101 may calculate an azimuth angle and an elevation angle (e.g., direction information of FIG. 5B) at which a beamforming signal is transmitted, by using a first distance 1501 (e.g., 20 cm) between the electronic device 101 and the external object 550, the coordinates (xmmWave, ymmWave) where the third antenna module 246-2 is disposed, and Equation 2 below.

$$\text{azimuth} = \tan^{-1} \frac{x' - x_{mmWave}}{\text{first distance}} \quad \text{Equation 2}$$

$$\text{elevation} = \tan^{-1} \frac{y' - y_{mmWave}}{\text{first distance}}$$

For example, when user authentication is performed, the electronic device 101 may guide the user such that the first distance 1501 between the electronic device 101 and the external object 550 is 20 cm. In this case, the first distance 1501 may be 20 cm (or 200 mm).

According to an embodiment, the electronic device 101 may transmit a beamforming signal based on the azimuth angle and the elevation angle calculated through Equation 2 above.

Figure 16:
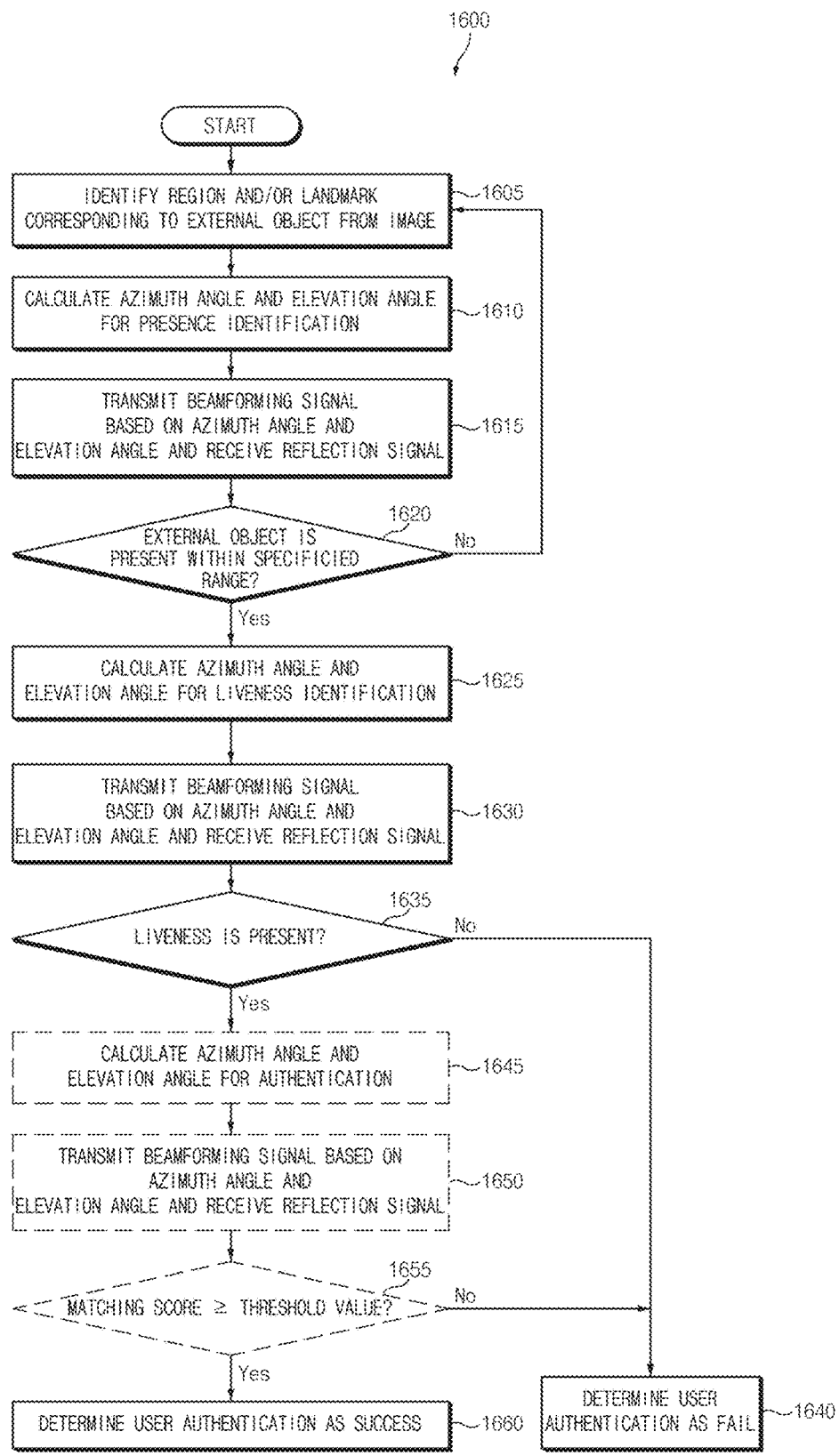
FIG. 16 illustrates an operation flowchart of an electronic device performing user authentication by using an azimuth angle and an elevation angle, according to various embodiments.

FIG. 16 illustrates an operation flowchart of the electronic device 101 performing user authentication by using an azimuth angle and an elevation angle, according to various embodiments. Operations illustrated in FIG. 16 may be an embodiment of operation 570 to operation 580 in FIG. 5B.

Referring to FIG. 16, to perform user authentication, the electronic device 101 may perform presence identification (e.g., operation 1605 to operation 1620), liveness identification (e.g., operation 1625 to operation 1635), and user authentication (e.g., operation 1640 to operation 1655). The presence identification may refer to an operation of determining whether an external object (e.g., 550 of FIG. 15) is present in a specified range (e.g., 551-2 of FIG. 15) of an obtained image (e.g., 1520 of FIG. 15). The liveness identification may refer to an operation of determining whether there is a movement of the external object. For example, because a body of the user moves in units of micro meter even in a state where the user does not move, the electronic device 101 may detect the movement through a beamforming signal. The user authentication may refer to an operation of determining whether a shape of an external object detected through the camera module 180 and the third antenna module 246-2 is matched with a pattern stored in advance in the electronic device 101 (or an external cloud server).

According to an embodiment, the number of required coordinates may increase in the order of the user authentication, the liveness identification, and the presence identification. For example, coordinates required for the presence identification may correspond to center coordinates of an external object, coordinates required for the liveness identification may correspond to a feature point of the external object, and coordinates required for the user authentication may correspond to the whole region of the external object. As illustrated in FIG. 16, the electronic device 101 may authenticate the user by performing all of operation 1605 to operation 1655 or may omit at least one thereof. For example, when the electronic device 101 may perform the user authentication by using coordinates calculated for the liveness identification, the electronic device 101 may omit operation 1640 to operation 1655. For another example, when the electronic device 101 may perform the user authentication by using coordinates calculated for the presence identification, the electronic device 101 may omit operation 1625 to operation 1655.

In operation 1605 of the operation flowchart 1600, the electronic device 101 may identify at least one of a region (e.g., 551-1 of FIG. 15) or landmark coordinates (e.g., (x', y') of FIG. 15) corresponding to an external object (e.g., 550 of FIG. 15) from an image (e.g., 1520 of FIG. 15). The electronic device 101 may obtain the image 1520 by using the camera module 180 and may identify at least one of the region or the landmark coordinates corresponding to the external object by using coordinates of the obtained image 1520 and Equation 1 above.

In operation 1610, the electronic device 101 may calculate an azimuth angle and an elevation angle for the presence identification by using the coordinates obtained in operation 1605 and Equation 2 above.

In operation 1615, the electronic device 101 may transmit a beamforming signal through the third antenna module 246-2 based on the azimuth angle and the elevation angle and may receive a reflection wave.

In operation 1620, the electronic device 101 may determine whether an external object is present within a specified range, by using the received reflection wave. According to an embodiment, the electronic device 101 may determine whether the external object is present within the specified range, based at least on a phase, a time of flight (ToF), or a magnitude of the reflection wave.

According to an embodiment, when a distance (e.g., the first distance 1510 of FIG. 15) between the external object and the electronic device 101 in which a location of the external object is in advance stored does not exist, or when the external object does not exist within the specified range, the electronic device 101 may again calculate a magnification of the camera module 180 or may again perform operation 1605 or operation 1620.

When the external object is present within the specified range, in operation 1625, the electronic device 101 may calculate an azimuth angle and an elevation angle for the liveness identification.

In operation 1630, the electronic device 101 may transmit a beamforming signal through the third antenna module 246-2 based on the azimuth angle and the elevation angle and may receive a reflection wave.

In operation 1635, the electronic device 101 may determine whether the liveness is present, by using the received reflection wave. For example, the electronic device 101 may detect a movement (or a skin pattern) of the external object by comparing a vibration pattern of at least one of a phase, a ToF, or a magnitude of the reflection wave with a vibration pattern stored in advance. When the liveness does not exist, in operation 1640, the electronic device 101 may determine the user authentication as a fail.

When the external object is present, in operation 1645, the electronic device 101 may calculate an azimuth angle and an elevation angle for the user authentication.

In operation 1650, the electronic device 101 may transmit a beamforming signal through the third antenna module 246-2 based on the azimuth angle and the elevation angle and may receive a reflection wave.

In operation 1655, the electronic device 101 may compare the external object determined based on the received reflection wave with a pattern stored in advance in the electronic device 101 (or an external cloud server) and may determine whether a matching score generated as a comparison result is equal to or more than a specified threshold value. When the matching score is equal to or more than the specified threshold value, in operation 1660, the electronic device 101 may determine the user authentication as a success. When the matching score is less than the specified threshold value, in operation 1640, the electronic device 101 may determine the user authentication as a fail.

According to an embodiment, the pattern (e.g., a vibration pattern, a pattern corresponding to a part of the user's body, or a skin pattern) stored in the electronic device 101 or the external cloud server may be generated or updated. For example, the machine learning may be performed by a framework stored in the electronic device 101 or an external server.

As described above, an electronic device (e.g., the electronic device 101 of FIG. 1) may include a camera (e.g., the camera module 180 of FIG. 1) including at least one lens, an antenna array (e.g., the antenna 248 of FIG. 2) capable of outputting a beamforming signal in a direction corresponding to an axis of the at least one lens, a communication circuit (e.g., at least one of the third RFIC 226 or the fourth RFIC 228 of FIG. 2) electrically connected with the antenna array, and a processor (e.g., the processor 120 of FIG. 1). The processor may identify a function being executed through the processor, may output a first specified beamforming signal capable of communicating with an external electronic device through the antenna array by using the communication circuit, when the function does not use the camera, and may output a second specified beamforming signal capable of detecting an external object through the antenna array by using the communication circuit, when the function uses the camera.

According to an embodiment, the processor may detect the external object by using the second specified beamforming signal and may perform user authentication depending on a result of detecting the external object.

According to an embodiment, when the function uses the camera, the processor may output the first specified beamforming signal and the second specified beamforming signal through the antenna array in a time-division manner.

According to an embodiment, when the function uses the camera, the processor may execute the camera, may recognize the external object by using the executed camera, may perform beamforming based on direction information of the recognized external object, by using the second specified beamforming signal, and may perform the user authentication depending on a result of performing the beamforming.

According to an embodiment, the antenna array may be disposed at a location adjacent to the camera.

According to an embodiment, the antenna array may be disposed under a first region of a front plate of the electronic device, in which a display of the electronic device is not driven.

According to an embodiment, the electronic device may further include a display formed of a plurality of layers, and the antenna array may be included in a layer forming a metal mesh structure from among the plurality of layers.

As described above, a method of an electronic device (e.g., the electronic device 101 of FIG. 1) may include executing a camera, identifying an external object by using the executed camera, performing beamforming, based on direction information corresponding to at least a portion of the external object, and performing user authentication, based at least on a result of performing the beamforming.

According to an embodiment, the method may further include identifying a function being executed at the electronic device, outputting a first specified beamforming signal capable of communicating with an external electronic device, when the function does not use the camera, and executing the camera when the function uses the camera.

According to an embodiment, the performing of the beamforming may include outputting the first specified beamforming signal and a second specified beamforming signal capable of recognizing a face of the user by using a time-division manner.

According to an embodiment, the first specified beamforming signal and the second specified beamforming signal may include a frequency band of 6 gigahertz (GHz) or higher.

According to an embodiment, the camera may be disposed to be exposed through a front of the electronic device, the electronic device may further include an antenna array disposed at a location adjacent to the camera, and the outputting of the second specified beamforming signal may include outputting the second specified signal by using the antenna array.

As described above, an electronic device (e.g., the electronic device 101 of FIG. 1) may include at least one processor (e.g., the processor 120 of FIG. 1 or the second communication processor 214 of FIG. 3), a first communication circuit (e.g., the fourth RFIC 228 of FIG. 2) for up-converting a signal in a first frequency band obtained from the at least one processor into a signal in a second frequency band higher than the first frequency band, a first antenna module (e.g., the third antenna module 246-1 of FIG. 3) disposed at a first region of the electronic device and including a second communication circuit (e.g., the third RFIC 226) for up-converting the signal in the second frequency band obtained from the first communication circuit into a signal in a third frequency band higher than the second frequency band, and a second antenna module (e.g., the third antenna module 246-2 of FIG. 3) disposed at a second region of the electronic device and including the second communication circuit for up-converting the signal in the second frequency band into the signal in the third frequency band, and the at least one processor may perform communication using the signal in the third frequency band by using the second antenna module or may recognize an external object by using the second antenna module.

According to an embodiment, the second antenna module may include an antenna array (e.g., the antenna 248 of FIG. 2) formed of a plurality of antenna elements, and the at least one processor may recognize the external object by using a beamforming signal output through the antenna array.

According to an embodiment, the first antenna module and the second antenna module may transmit or receive a signal in a ultra-high frequency band.

According to an embodiment, the electronic device may further includes a camera (e.g., the camera module 180 of FIG. 1) disposed to be exposed through a front of the electronic device, and the at least one processor may allow the second antenna module to recognize the external object when a function using the camera from among functions of the electronic device is executed and may allow the second antenna module to perform the communication when the function using the camera is not executed.

According to an embodiment, the second region may correspond to a location adjacent to the camera.

According to an embodiment, the second antenna module may be disposed under a first region of a front plate of the electronic device, in which a display of the electronic device is not driven.

According to an embodiment, the second antenna module may include an antenna array formed of a plurality of antenna elements on a first surface of the second antenna module, and may include the second communication circuit on a second surface facing away from the first surface.

According to an embodiment, the electronic device may further include a camera, and the at least one processor may execute the camera, may identify the external object by using the executed camera, may perform beamforming based on direction information corresponding to at least a portion of the identified external object by using the second antenna module, and may perform the user authentication based at least on a result of performing the beamforming.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device comprising:
a camera including at least one lens;
an antenna array;
a communication circuit electrically connected with the antenna array; and
a processor, wherein the processor is configured to:

identify a function being executed through the processor;

when the function does not use the camera, output a first specified beamforming signal capable of communicating with an external electronic device through the antenna array by using the communication circuit, and when the function uses the camera:
obtain an image associated with an external object by using the camera,
identify a region of the obtained image, in which the external object exists,
determine a direction in which to output a second specified beamforming signal based on the identified region of the image, a distance between the camera and the antenna array, and a magnification of the camera,
output the second specified beamforming signal in the determined direction through the antenna array by using the communication circuit,
receive a beamforming signal reflected from an area where the external object exists, and
perform user authentication using the received beamforming signal.

2. The electronic device of claim 1, wherein the processor is configured to:
detect the external object by using the second specified beamforming signal; and
perform the user authentication depending on a result of detecting the external object.

3. The electronic device of claim 1, wherein the processor is configured to:
when the function uses the camera, output the first specified beamforming signal and the second specified beamforming signal through the antenna array in a time-division manner.

4. The electronic device of claim 2, wherein the processor is configured to:
when the function uses the camera,
execute the camera;
recognize the external object by using the executed camera;
perform beamforming based on direction information of the recognized external object, by using the second specified beamforming signal; and
perform the user authentication depending on a result of performing the beamforming.

5. The electronic device of claim 1, wherein the antenna array is disposed at a location adjacent to the camera.

6. The electronic device of claim 1, wherein the antenna array is disposed under a first region of a front plate of the electronic device, in which a display of the electronic device is not driven.

7. The electronic device of claim 1, further comprising:
a display formed of a plurality of layers, wherein the antenna array is included in a layer forming a metal mesh structure from among the plurality of layers.

8. A method of an electronic device comprising:
identifying a function being executed at the electronic device;

when the function does not use a camera of the electronic device, communicating with an external electronic device through an antenna array of the electronic device; and when the function uses the camera:
obtaining an image associated with an external object by using the camera;
identifying a region of the obtained image, in which the external object exists;
determining a direction in which to output a beamforming signal based on the identified region of the image, a distance between the camera and the antenna array, and a magnification of the camera;
outputting the beamforming signal in the determined direction through the antenna array;
receiving a reflected signal reflected from an area where the external object exists; and
performing user authentication, based at least on the received reflected signal.

9. The method of claim 8,
wherein the communicating comprises outputting a first specified beamforming signal capable of communicating with the external electronic device, and
wherein the outputting of the beamforming signal comprises outputting a second specified beamforming signal capable of detecting the external object.

10. The method of claim 9, wherein
the first specified beamforming signal and the second specified beamforming signal are output by using a time-division manner.

11. The method of claim 10, wherein the first specified beamforming signal and the second specified beamforming signal include a frequency band of 6 gigahertz (GHz) or higher.

12. The method of claim 10,
wherein the camera is disposed to be exposed through a front of the electronic device, and
wherein the antenna array is disposed at a location adjacent to the camera.

13. The method of claim 12, wherein the antenna array is disposed under a first region of a front plate of the electronic device, in which a display of the electronic device is not driven.

14. The method of claim 12, wherein the electronic device includes a display formed of a plurality of layers,
wherein the antenna array is included in a layer forming a metal mesh structure from among the plurality of layers.

15. The method of claim 9,
wherein the outputting of the first specified beamforming signal includes outputting the first specified beamforming signal by using a first antenna module included in the electronic device, and
wherein the outputting of the second specified beamforming signal includes outputting the second specified beamforming signal by using a second antenna module included in the electronic device.

* * * * *